US011305355B2

(12) United States Patent
Missout

(10) Patent No.: US 11,305,355 B2
(45) Date of Patent: Apr. 19, 2022

(54) HIGH TEMPERATURE, HIGH PRESSURE, POWDER-BASED, 3D PRINTED OBJECT MANUFACTURING

(71) Applicant: Kilncore Inc., Sutton (CA)

(72) Inventor: Antoine Missout, Sutton (CA)

(73) Assignee: KILNCORE INC., Sutton (CA)

(*) Notice: Subject to any disclaimer, the term of this patent is extended or adjusted under 35 U.S.C. 154(b) by 0 days.

(21) Appl. No.: 17/244,464

(22) Filed: Apr. 29, 2021

(65) Prior Publication Data

US 2021/0362239 A1 Nov. 25, 2021

Related U.S. Application Data

(60) Provisional application No. 63/028,272, filed on May 21, 2020.

(51) Int. Cl.
| | |
|---|---|
| *B22F 10/34* | (2021.01) |
| *B33Y 10/00* | (2015.01) |
| *B33Y 40/00* | (2020.01) |
| *B22F 12/20* | (2021.01) |
| *B22F 12/17* | (2021.01) |

(Continued)

(52) U.S. Cl.
CPC .............. *B22F 10/34* (2021.01); *B22F 10/85* (2021.01); *B22F 12/17* (2021.01); *B22F 12/20* (2021.01); *B22F 12/224* (2021.01); *B22F 12/33* (2021.01); *B22F 12/58* (2021.01); *B22F 12/70* (2021.01); *B22F 12/90* (2021.01); *B33Y 10/00* (2014.12);

(Continued)

(58) Field of Classification Search
None
See application file for complete search history.

(56) References Cited

U.S. PATENT DOCUMENTS

| | | | |
|---|---|---|---|
| 9,776,376 B2 | 10/2017 | Swartz et al. | |
| 10,675,687 B2 | 6/2020 | Walker et al. | |

(Continued)

FOREIGN PATENT DOCUMENTS

| | | |
|---|---|---|
| CN | 105252002 A | 3/2017 |
| EP | 3055090 B1 | 9/2017 |

(Continued)

OTHER PUBLICATIONS

International Search Report, Michael Green, dated May 12, 2021, 11 pages.

(Continued)

*Primary Examiner* — Anthony M Liang
(74) *Attorney, Agent, or Firm* — Benoit & Cote Inc.; Antoine Missou

(57) ABSTRACT

An additive manufacturing device (AMD) for manufacturing objects through deposition of superposed layers of material in a granulate or powder form, the AMD comprising: a hydraulic cylinder; a mold for sealable attachment to the hydraulic cylinder; a material deposition station having an outlet for depositing the material in the mold layer-by-layer; a heating element; and a compressor. Between the deposition of one or more layers of material in the mold, the mold and the hydraulic cylinder are sealably attached to form a pressure container, the compressor injects gas in the container to increase a pressure within the pressure container and the heating element provides heat within the pressure container to further increase the pressure and to perform sintering or high-temperature synthesis of the material while submitting the material to the pressure.

17 Claims, 31 Drawing Sheets

(51) Int. Cl.
    *B22F 12/00*     (2021.01)
    *B22F 12/33*     (2021.01)
    *B22F 12/90*     (2021.01)
    *B33Y 50/02*     (2015.01)
    *B22F 12/58*     (2021.01)
    *B22F 10/85*     (2021.01)
    *B33Y 30/00*     (2015.01)
    *B22F 12/70*     (2021.01)

(52) U.S. Cl.
    CPC .............. *B33Y 30/00* (2014.12); *B33Y 40/00* (2014.12); *B33Y 50/02* (2014.12)

(56) References Cited

U.S. PATENT DOCUMENTS

| | | |
|---|---|---|
| 10,722,947 B2 | 7/2020 | Cullinan et al. |
| 2010/0111744 A1 | 5/2010 | Schleiss et al. |
| 2017/0097635 A1 | 3/2017 | Barash et al. |
| 2017/0136538 A1 | 5/2017 | Yoshimura |
| 2018/0036801 A1 | 2/2018 | Ishihara et al. |
| 2019/0099836 A1 | 4/2019 | Wang et al. |
| 2019/0118468 A1 | 4/2019 | Bobar et al. |
| 2019/0202125 A1 | 7/2019 | Batchelder |
| 2019/0210151 A1 | 7/2019 | Deal et al. |
| 2019/0270136 A1 | 9/2019 | Gibson |
| 2019/0352743 A1 | 11/2019 | Lu et al. |
| 2020/0147874 A1 | 5/2020 | Dudukovic et al. |
| 2020/0198246 A1 | 6/2020 | El-Wardany et al. |
| 2021/0008622 A1 | 1/2021 | Martin et al. |
| 2021/0060863 A1 | 3/2021 | Rudolph et al. |

FOREIGN PATENT DOCUMENTS

| | | |
|---|---|---|
| EP | 2776233 B1 | 12/2017 |
| JP | 5573338 | 8/2014 |
| WO | 2007073205 | 6/2007 |
| WO | 2012120231 A1 | 9/2012 |
| WO | 2015080888 A2 | 6/2015 |
| WO | 2015081996 A1 | 6/2015 |
| WO | 2015196149 A1 | 12/2015 |
| WO | 2017027784 A1 | 2/2017 |
| WO | 2017131790 A1 | 8/2017 |
| WO | 2017179052 | 10/2017 |
| WO | 2017197388 A1 | 11/2017 |
| WO | 2017208234 A1 | 12/2017 |
| WO | 2018227229 A1 | 12/2018 |
| WO | 2019052128 A1 | 3/2019 |
| WO | 2019079423 A1 | 4/2019 |
| WO | 2019106382 A1 | 6/2019 |
| WO | 2019136523 A1 | 7/2019 |
| WO | 2019236074 A1 | 12/2019 |
| WO | 2019241886 | 12/2019 |
| WO | 202064756 | 4/2020 |
| WO | 2020070107 A1 | 4/2020 |
| WO | 2020126086 A1 | 6/2020 |
| WO | 2020146416 A2 | 7/2020 |
| WO | 2020236610 A1 | 11/2020 |
| WO | 2020243522 A1 | 12/2020 |

OTHER PUBLICATIONS

Webpage—Aluminum Oxide, Al2O3 Ceramic Properties—https://www.accuratus.com/alumox.html.
Webpage—Tensifier Electric Pump System, https://www.highpressure.com/products/sprague-pumps-systems/etensifier/.
European Search Report, 11 pages, Nicolas Traon, dated Dec. 13, 2021.

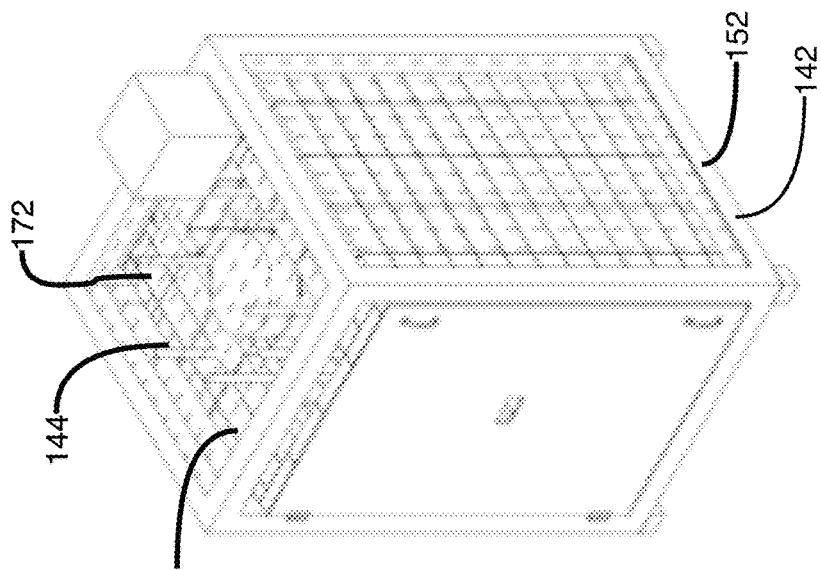
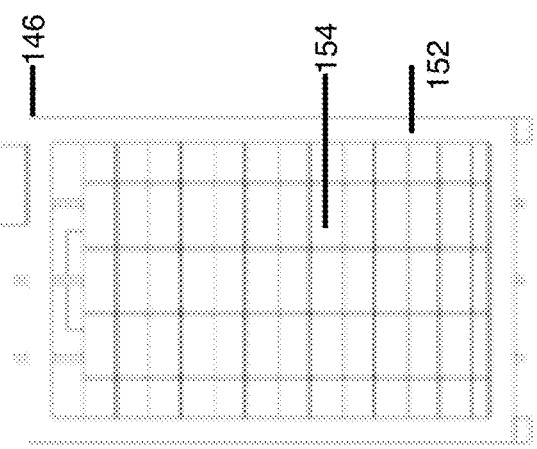
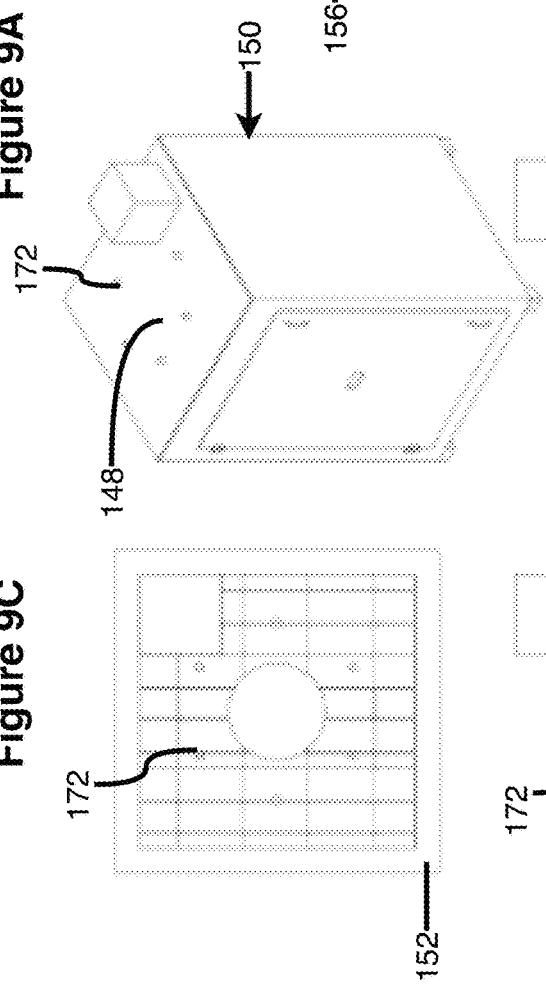
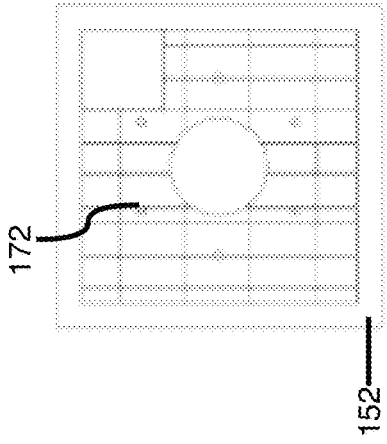
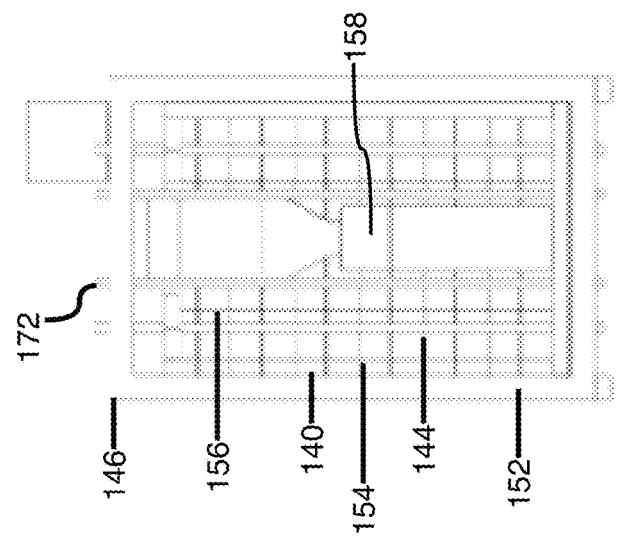

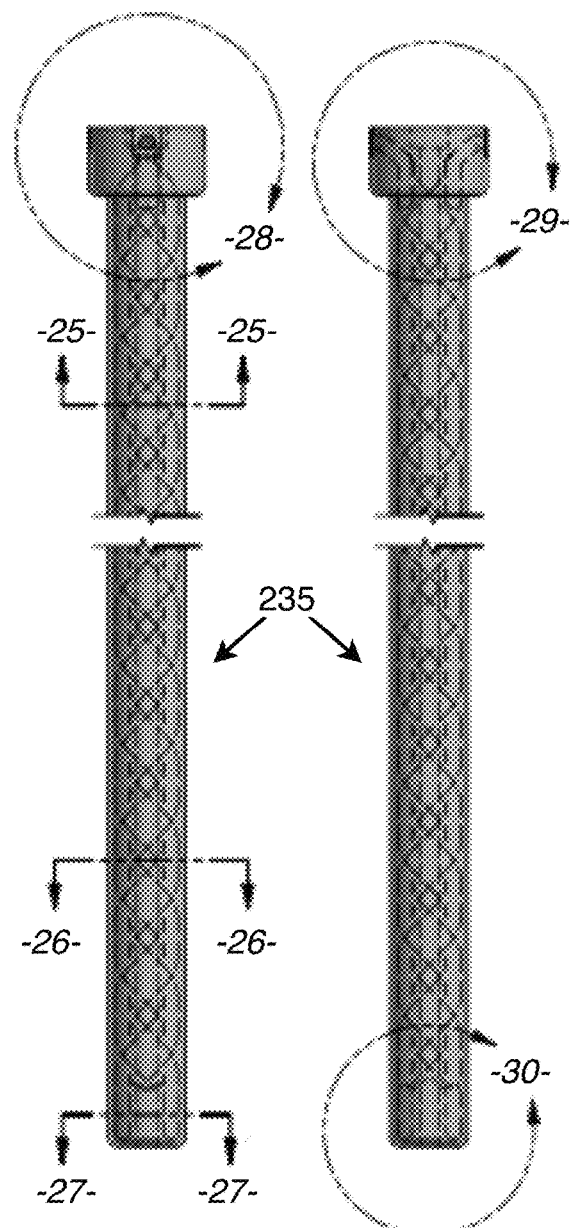
Figure 23
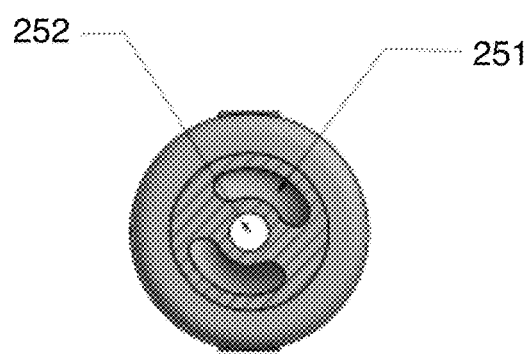
Figure 24
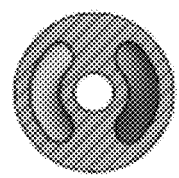
Figure 25
Figure 26
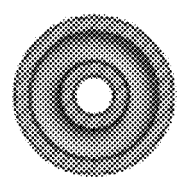
Figure 27

HIGH TEMPERATURE, HIGH PRESSURE, POWDER-BASED, 3D PRINTED OBJECT MANUFACTURING

CROSS-REFERENCE TO RELATED APPLICATION

This application claims priority from U.S. provisional patent application 63/028,272 filed May 21, 2020, the specification of which is hereby incorporated herein by reference in its entirety.

BACKGROUND (a) Field

The subject matter disclosed generally relates to 3D manufacturing tools, and tools adapted to perform additive manufacturing processing through deposition of additive materials. More particularly, the subject matter disclosed relates to 3D printers or other types of additive manufacturing devices.

(b) Related Prior Art

Machines and machine parts are becoming more complex with time. To allow these complex designs, new manufacturing technologies have been developed, comprising additive manufacturing performed using a 3D printer. However, the requirements for these machine parts also evolves, generating new requirements for the additive manufacturing as time passes. Examples of such evolution of requirements comprise the use of a combination of deposited materials to build the piece, the use of reinforcement material, the use of continuously evolving higher temperature fusing material, the manufacturing of a piece of machine using additive manufacturing being performed in a temperature-controlled environment, etc.

These requirements highlight limitations of the additive manufacturing technologies that is nowadays available. However, new designs of pieces of machines continuously push the boundaries of what needs to be manufactured.

Accordingly, the present subject-matter aims to push further at least some of these boundaries.

SUMMARY

According to an embodiment, there is provided an additive manufacturing device (AMD) for manufacturing objects through deposition of superposed layers of material in a granulate or powder form, the AMD comprising: a hydraulic cylinder; a mold for sealable attachment to the hydraulic cylinder; a material deposition station having an outlet for depositing the material in the mold layer-by-layer; a heating element; and a compressor; wherein between the deposition of one or more layers of material in the mold, the mold and the hydraulic cylinder are sealably attached to form a pressure container, the compressor injects gas in the container to increase a pressure within the pressure container and the heating element provides heat within the pressure container to further increase the pressure and to perform sintering or high-temperature synthesis of the material while submitting the material to the pressure.

According to an aspect, the AMD further comprises a sliding plate to which the mold is attached, wherein the sliding plate moves between a deposition position in which the mold receives the material and a pressure/sintering/synthesizing position in which the mold is sealed with the hydraulic cylinder.

According to an aspect, the material deposition station comprises a vibrating straw which comprises the outlet and which further comprises cooling conduits receiving a coolant fluid to cool the vibrating straw.

According to an aspect, the material deposition station further comprises a driving speaker to vibrate the vibrating straw and thereby control a flow of material therein.

According to an aspect, the material deposition station further comprises a sensing speaker to measure a movement of the vibrating straw to provide feedback to finely control the flow of material in the vibrating straw.

According to an aspect, the material deposition station further comprises reservoirs for the material and a mixer which combines the material from the reservoirs before the material reaches the vibrating straw.

According to an aspect, the material deposition station further comprises a flow controller for each one of the reservoirs and a linear motor connected to each flow controller, wherein upon producing movement, the linear motor shakes the flow controller thereby permitting a flow of material through the flow controller.

According to an aspect, the material deposition station further comprises a transparent section between the mixer and the vibrating straw, and wherein the material deposition station further comprises a camera to monitor the flow of material therethrough.

According to an aspect, the mold comprises plates which are stacked on top each other.

According to an aspect, the mold further comprises a refractory sleeve lining an inside of the plates.

According to an aspect, the mold further comprises graphite-impregnated packing seals between the plates.

According to an aspect, the mold further comprises a cooling plate at a bottom and top portion thereof.

According to an aspect, the mold further comprises a pressure diffusing plate enabling a lowering of pressure within the container.

According to an embodiment, there is provided a method for manufacturing objects made of superposed deposition of layers of material, the method comprising: depositing one or more layers of material inside a mold; pressurizing the inside of the mold; heating the inside of the mold thereby sintering or high-temperature synthesizing the material; depressurizing the mold; and repeating the depositing, the pressurizing, the heating and depressurizing.

According to an aspect, the pressurizing the inside of the mold comprises sealably closing the mold and injecting pressurized gas inside the mold.

According to an aspect, the heating the inside of the mold comprises using a heat element above the layer of material to heat the one or more layers of material and the pressured gas.

According to an aspect, the method further comprises performing the depositing at a material deposition station and the pressurizing, heating and depressurizing at a heating/sintering/synthesizing station.

According to an aspect, the pressurizing the inside of the mold comprises injecting gas into the mold under of pressure of at least 20 kpsi, wherein the pressure of the gas inside the mold increases further when heating the inside of the mold.

According to an aspect, the depositing of one or more layers of material comprises depositing a single layer of material.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which:

FIGS. 9A to 9E are respectively a perspective view, a perspective view with some external walls removed, a top view with the external wall removed, a front view with the front wall removed and a side view with the side wall removed, of a kiln assembly in accordance with an embodiment;

FIGS. 23 to 30 are respectively a front view, a side view, a cross-section view according to line 25-25, a cross-section view according to line 26-26, a cross-section view according to line 27-27, a close-up front view according to line 28, a close-up side view according to line 29, and a close-up side view according to line 30 of a vibrating straw for depositing powders in accordance with an embodiment;

It will be noted that throughout the appended drawings, like features are identified by like reference numerals.

DETAILED DESCRIPTION

With respect to the present description, references to "3D printer" or Additive Manufacturing Device (AMD) should be understood to reference a machine, a tool or a device adapted to perform additive manufacturing processing through deposition of additive materials. Accordingly, the expression "3D printer" encompasses any device or subsystem of a tool adapted to perform such a process, regardless of the nature of the outcome of the process.

The terms "additive material", "powdered material", "powder", "granulated material", "granule" and other alternatives should be herein understood as replaceable unless expressively stated otherwise. The selection of the term "powder" and alternatives instead of the term "granule" and alternatives mostly refers to the dimension of the additive material, wherein the additive material undergoes a similar process further throughout the additive material traveling its course in the AMD.

References to items in the singular form should be understood to include items in the plural, and vice versa, unless explicitly stated otherwise or from the context.

Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values and of values herein or on the drawings are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described realizations. The use of any and all examples, or exemplary language ("e.g.," "such as," or the like) provided herein, is intended merely to better illuminate the exemplary realizations and does not pose a limitation on the scope of the realizations. No language in the specification should be construed as indicating any unclaimed element as essential to the practice of the realizations.

In the following description, it is understood that terms such as "first", "second", "top", "bottom", "above", "below", and the like, are words of convenience and are not to be construed as limiting terms.

The terms "top", "up", "upper", "bottom", "lower", "down", "vertical", "horizontal", "interior" and "exterior" and the like are intended to be construed in their normal meaning in relation with normal installation of the product.

Figure 1:
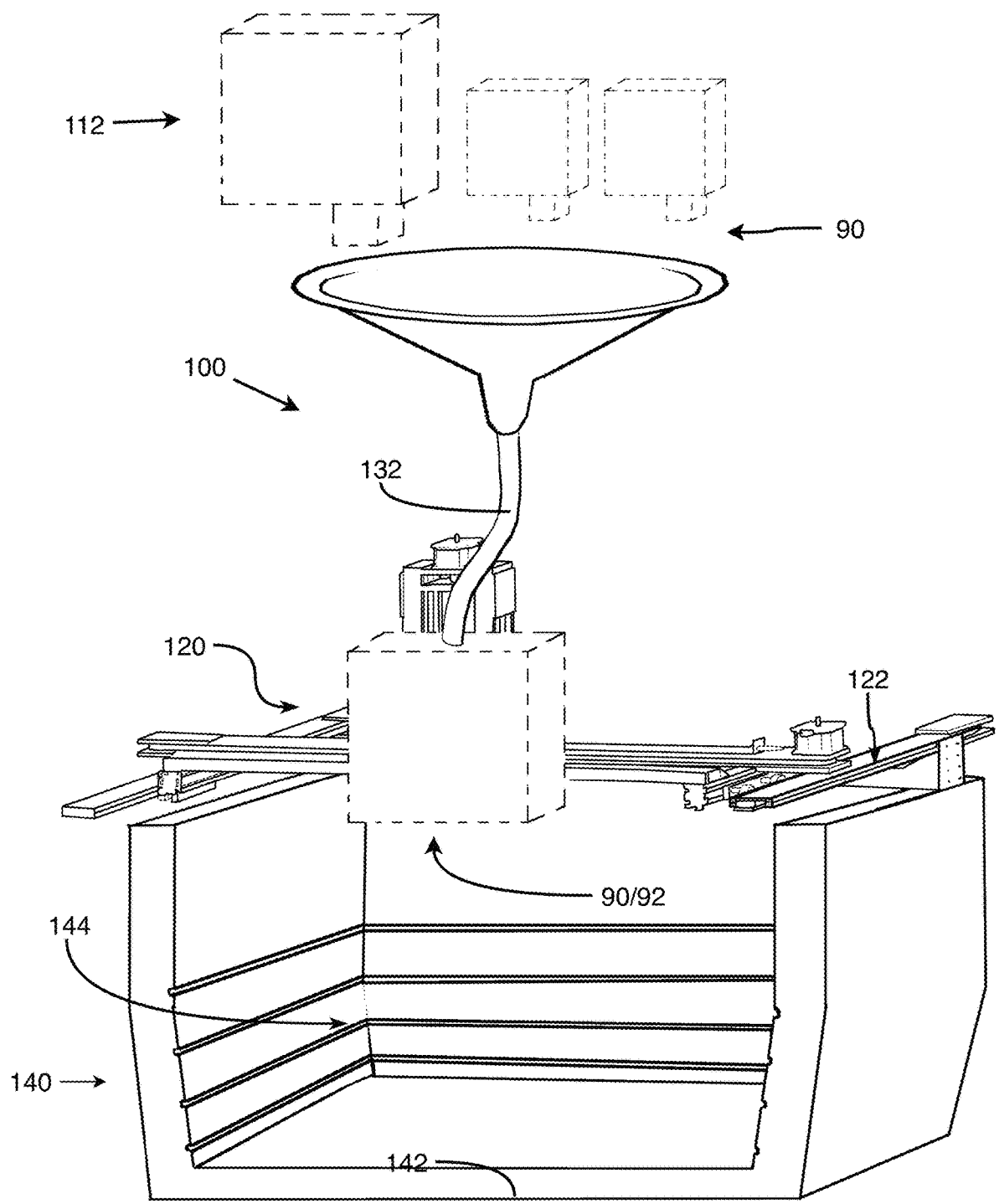
FIG. 1 is a schematic view of an Additive Manufacturing Device (AMD) adapted for additive manufacturing in accordance with an embodiment.
Figure 2:
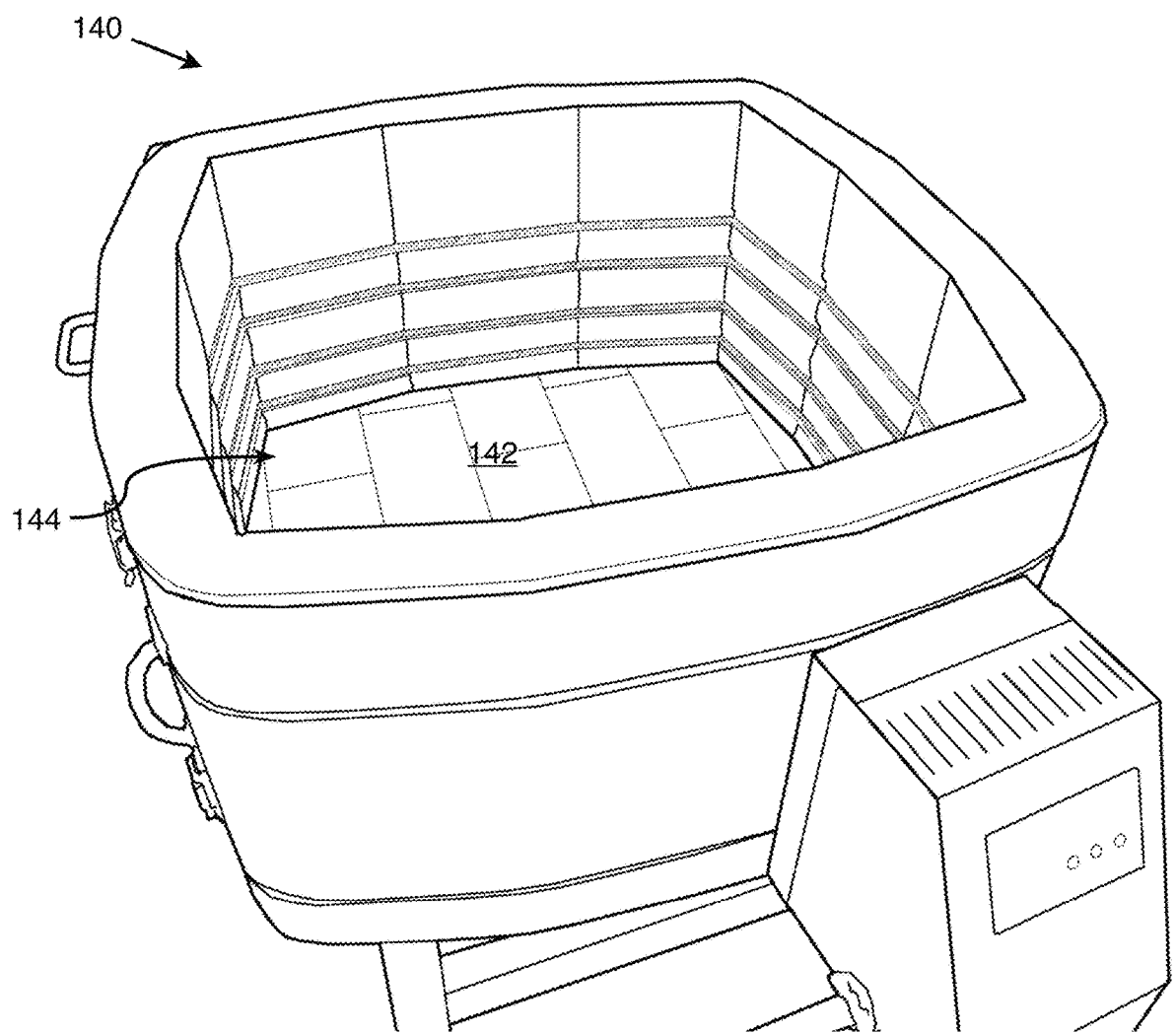
FIG. 2 is a perspective view of a kiln of the AMD of FIG. 1.

Referring now to FIGS. 1 and 2, the schematic of an Additive Manufacturing Device (AMD) 100 comprises a feeder block 112 to feed a printer block 120 with material 90, aka granules or powder. According to realizations, the printer block 120 may or may not be adapted to melt the material 90. The printer block 120 is further adapted to lay down, i.e., to deposit, on a build surface of a kiln 140 a flow of material (solid material 90 or melted material 92). Positions in which the material (solid material 90 or melted material 92) is laid down are controlled by a Computer Numerical Control (CNC) machine 122, which moves the printer block 120 relative to the build surface of the kiln 140; the latter being used in some realizations as a heated chamber 144 to provide a temperature-controlled environment to the material 90/92. When all the material 90/92 necessary to make a piece is laid down, i.e., when all the layers of material 90/92 have been deposited, on the build surface, the piece is cooled down slowly.

Such a technology allows to make a broad range of pieces using additive manufacturing, with the limitation of which piece it is possible to make depends on the design of the piece itself.

Figure 3:
FIG. 3 is a picture depicting two pieces of a printing head of an AMD that can be made using the embodiment of the AMD of FIG. 1.

However, some pieces such as the piece 75 of a printing head of an ADM depicted on FIG. 3 and object of patent application published under number WO2019241886 from the same applicant, requires additional characteristics, manufacturing processing and treatments. In case of the manufacturing of the piece 75, its manufacturing requires to take into account several constraints, comprising: that the piece 75 must be manufactured, i.e., 3D printed, from powder 90; that the ADM must be able to feed multiple powders 90, i.e., powders from multiple materials, and must be able to mix them in a well-controlled manner to make the piece 75; and that the material 90, at this step a non-final piece, must be treated at high temperature and pressure for the material to fuse into the final piece 75.

In light of the last constraint, an available solution resides in the use of a mold or other external structure on which to provide pressure in order for the material 90 to fuse into the final piece 75. That method provides a solution to respond to these constraints while a method of manufacture using free deposition, which is a method involving melted material over a built surface would not be able to. However, the standard use of a mold by itself does not fulfill all of the listed constraints, and particularly the pressure constraint.

Figure 4:
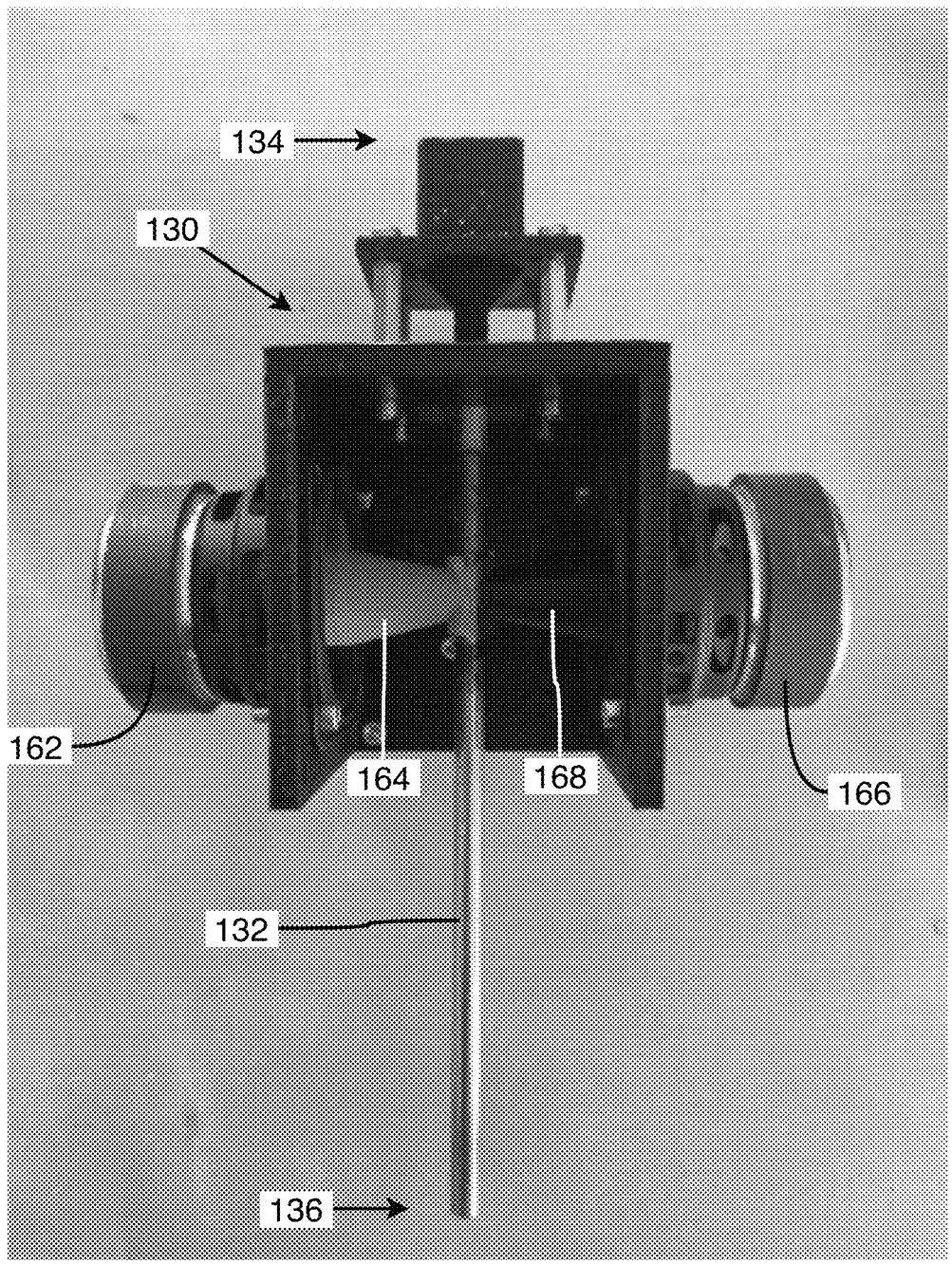
FIG. 4 is a picture of the front of a flow control assembly of the AMD of FIG. 1 in accordance with an embodiment.
Figure 6:
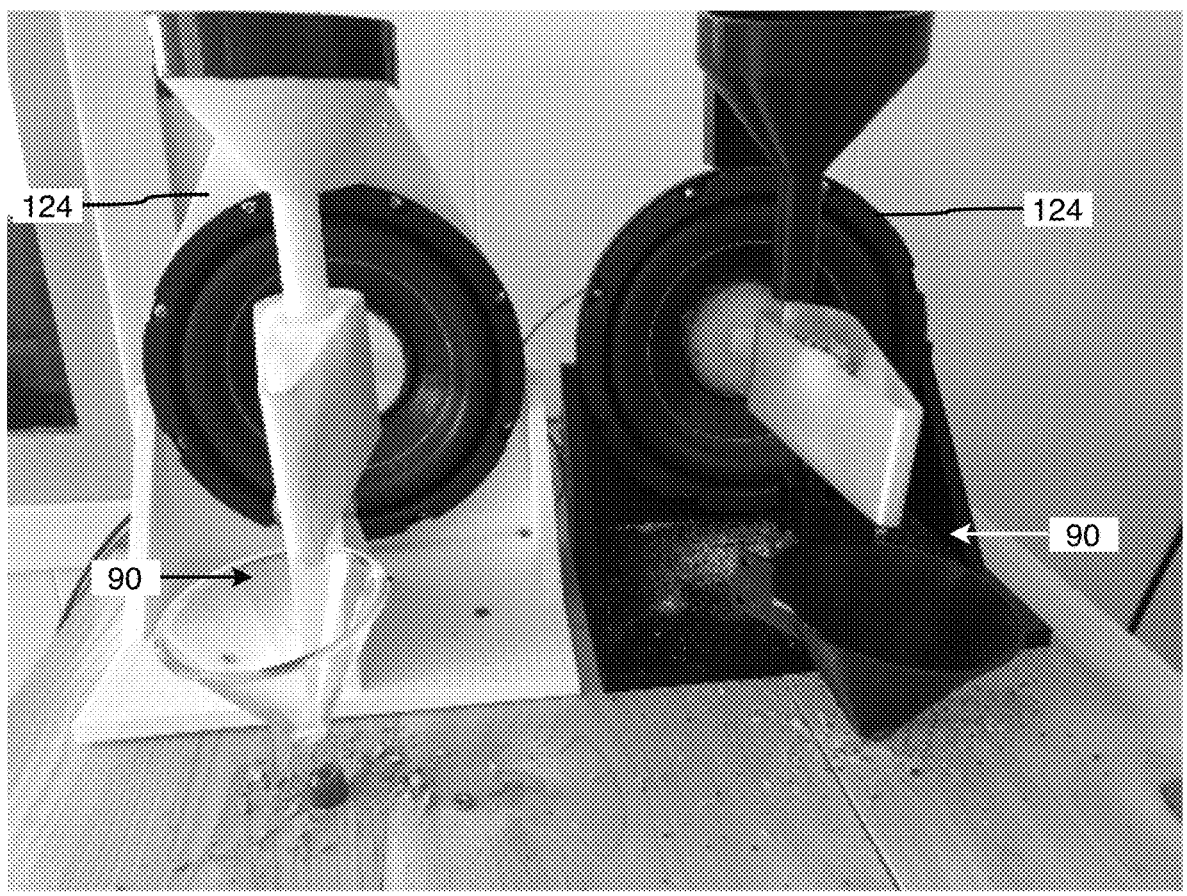
FIG. 6 is a picture of two dispensers using a loudspeaker to drive the flow of material as with the control flow assembly depicted on FIG. 4.
Figure 7:
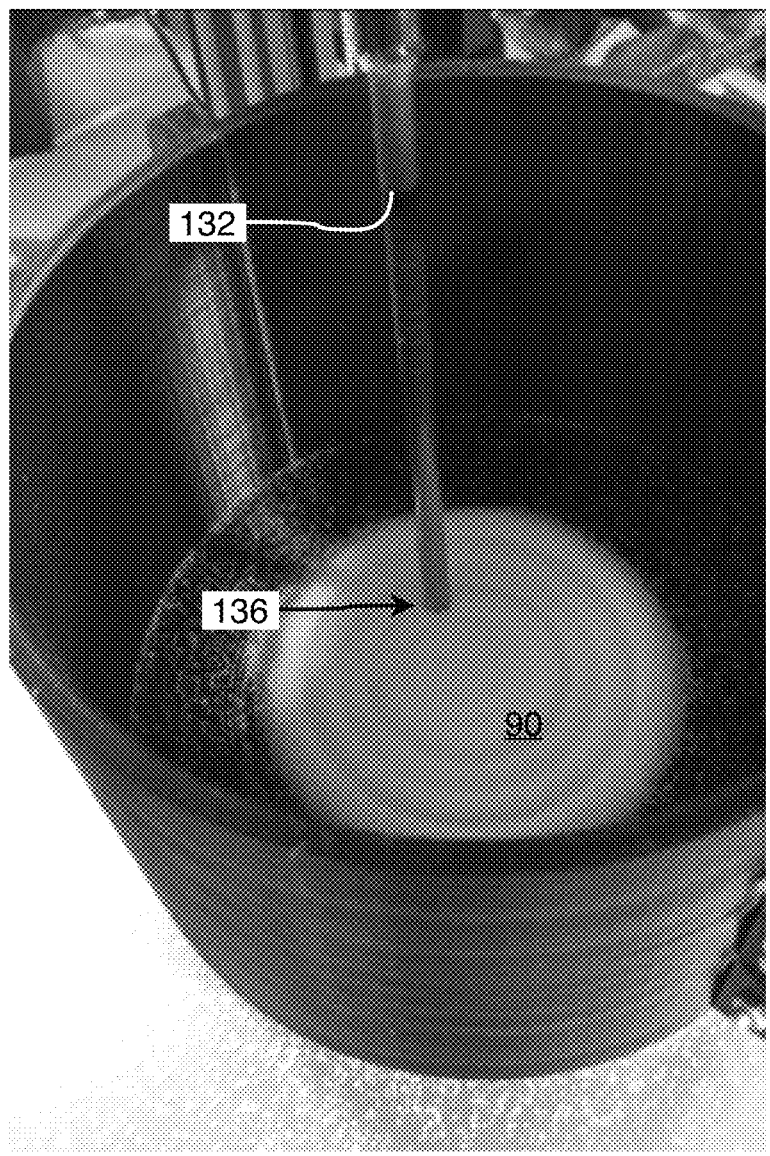
FIG. 7 is a picture showing the outlet of the flow control assembly of FIG. 4.
Figure 8B:
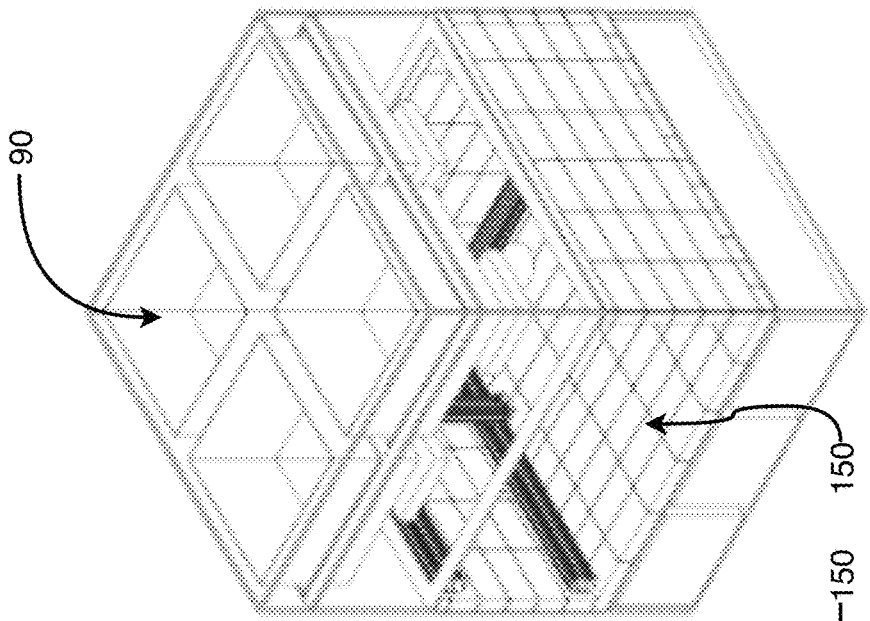
FIGS. 8A to 8E are respectively a perspective view, a perspective view with the external walls removed, a top view, a front view and a side view of an AMD in accordance with an embodiment.
Figure 8A:
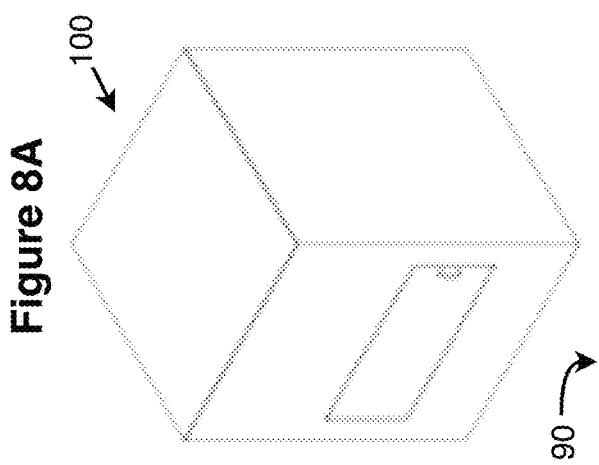
Figure 8E:
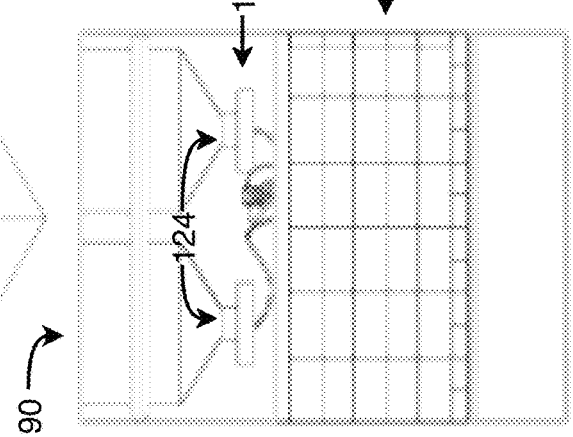
Figure 8C:
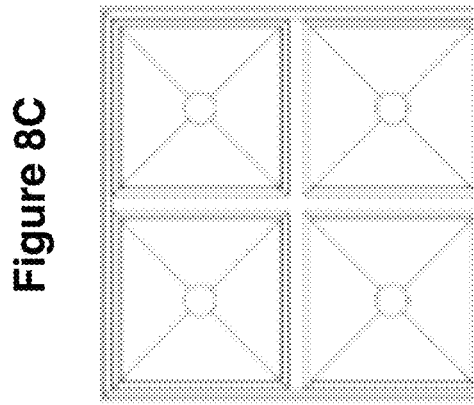
Figure 8D:
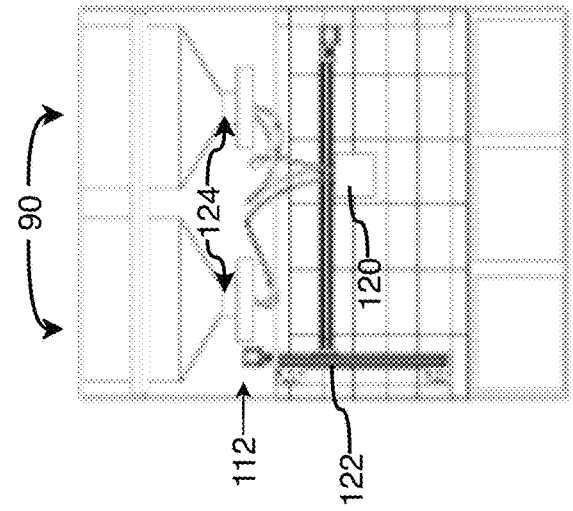
Figure 10:
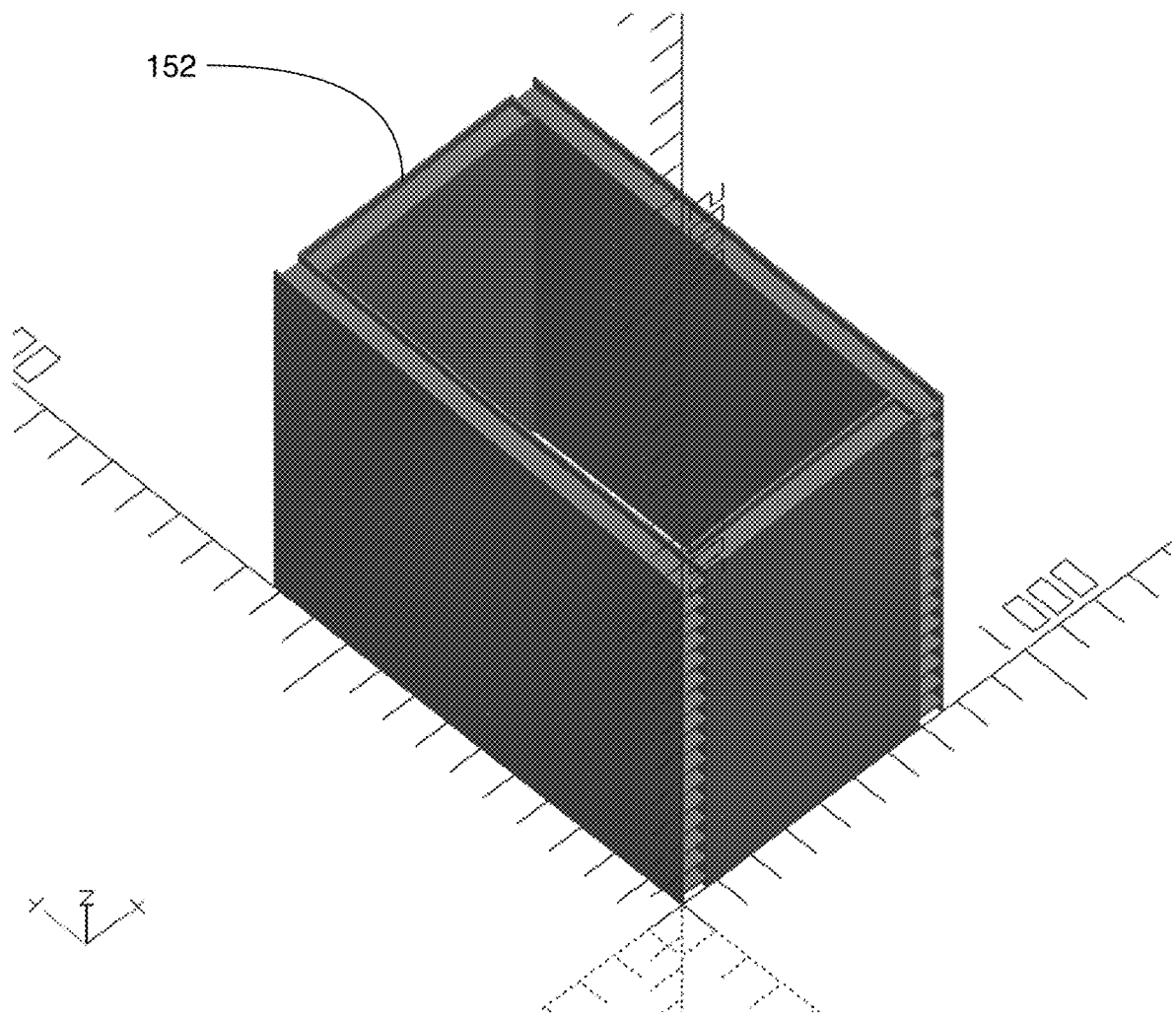
FIG. 10 is a schematic of a frame for a kiln assembly in accordance with an embodiment.
Figure 11:
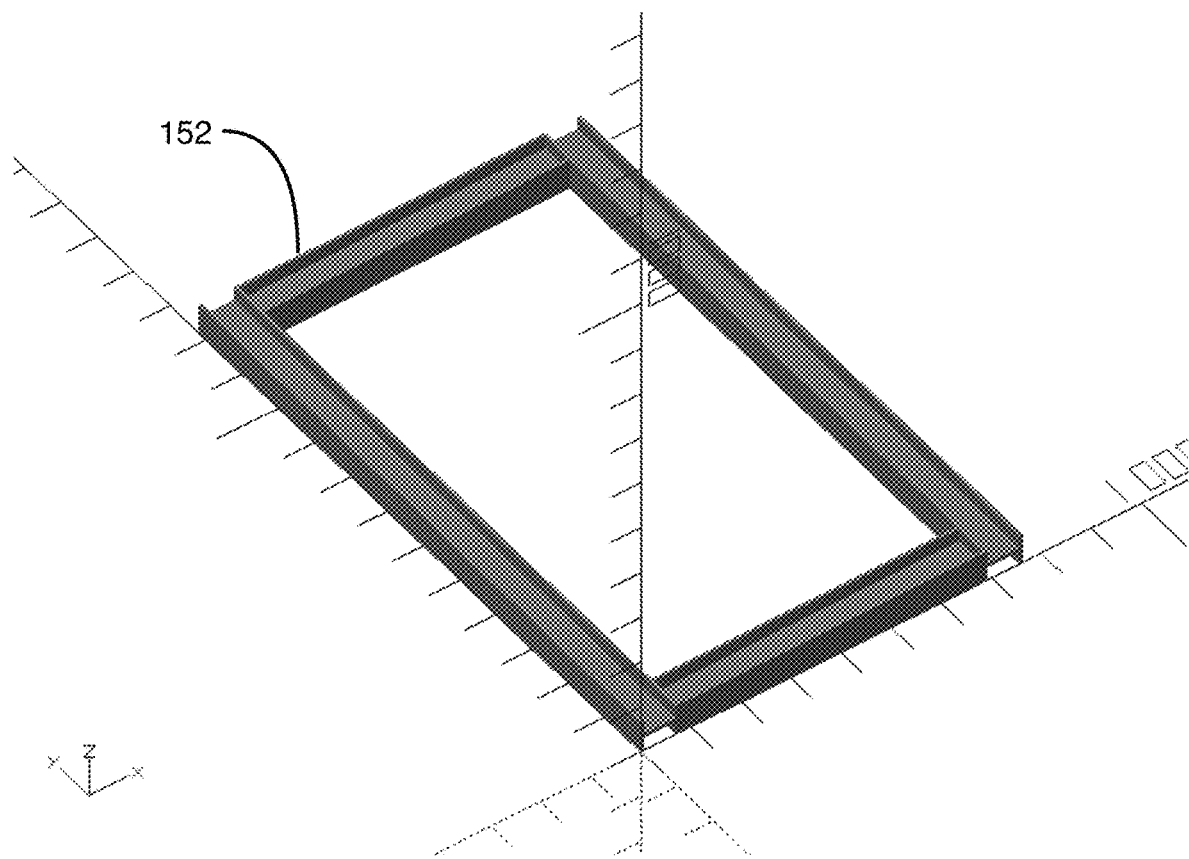
FIG. 11 is a schematic of the components taking part in a first story of the frame of FIG. 10 in a multi-story frame.

Referring to FIGS. 4, 6 and 7 in relation with the constraint of mixing multiple powders 90 in a controlled manner, the AMD 100 comprises a flow control assembly 130 optimizing the granularity of the control of the flow of material 90 used to manufacture the piece 75.

More precisely, the novel flow control assembly 130 aims to respond to issues of current powder dispensers. More precisely, the novel flow control assembly 130 aims to prevent that the flow does not match the rate needed to properly fill the mold. On one hand, with a flow that is insufficient, the process risks to create weaknesses in the pieces 75 therefrom. On the other hand, with the flow being above the required rate, the process would overfill the dispensing tube 132 and have consequences on the precision of the piece 75 and process characteristics.

To control the flow, a novel flow control assembly 130 comprises a dispensing tube 132, and more precisely a dispensing tube 132 comprising a flexible portion. The dispensing tube 132 is driven electro-mechanically, with its movement being measured. Dispensers 124 (see FIG. 1 where the dispensers 124 are depicted disconnected from the dispensing tube 132 and FIG. 6) are connected to the inlet 134 of the dispensing tube 132 through which the dispensers 124 dispense the material 90 through flexible tubes (not depicted) to the dispensing tube 132. The dispensing tube 132 is mechanically linked through link arms 164 and 168 to two loudspeakers 162 and 166 (in an alternative realization, one or both of the loudspeakers 162 and 166 are replaced with a system of coils, magnets, and springs able to perform a similar function). The dispensing tube 132 comprises at the bottom an outlet 136 through which the material 90 is dispensed downstream.

Figure 5:
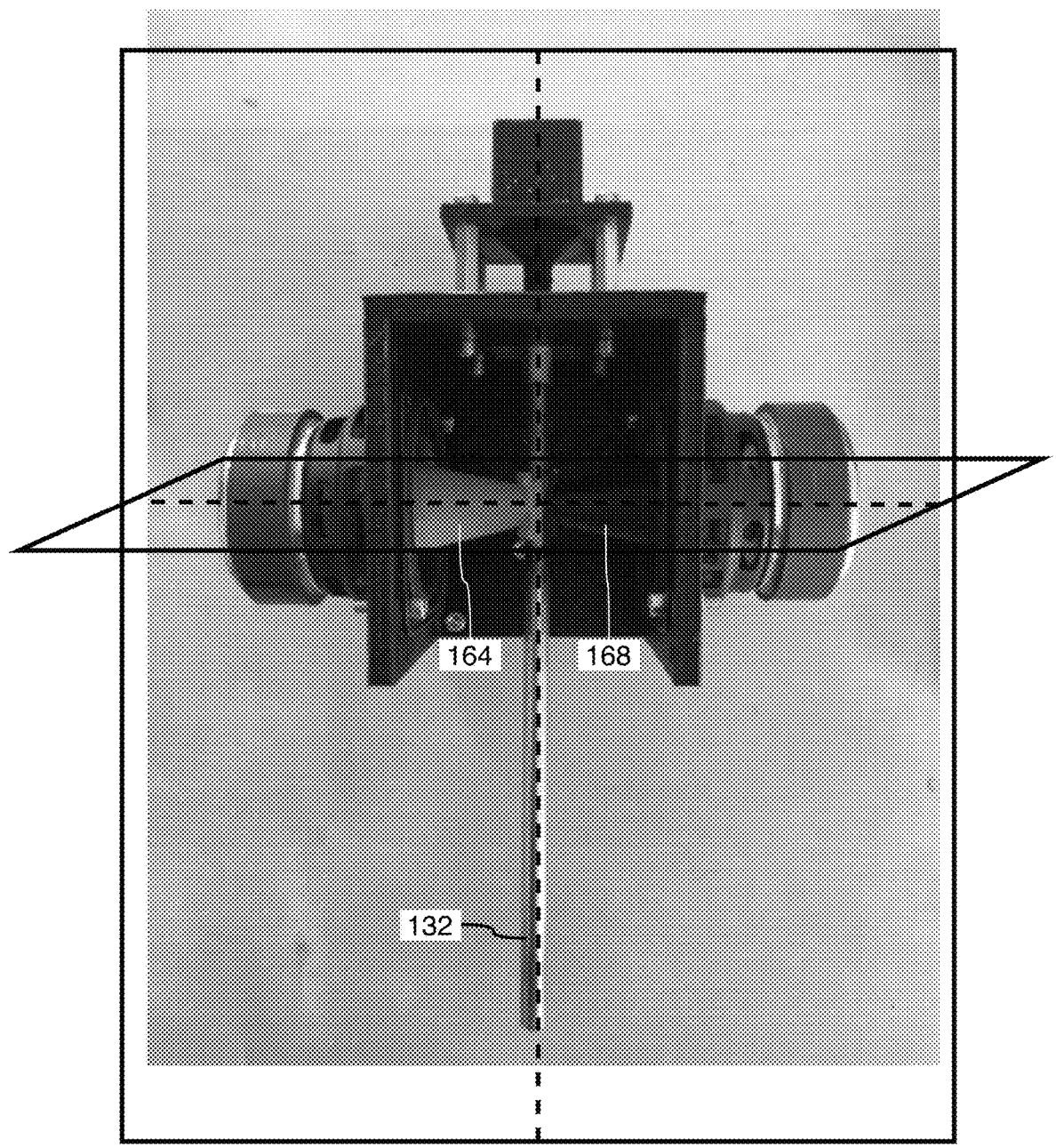
FIG. 5 is the picture of FIG. 4 with virtual planes as an aid in illustrating, in accordance with the depicted embodiment, spatial relationship between the components of the flow control assembly.

Referring additionally to FIG. 5, according to preferred realization, the connections of the link arms 164 and 168 to the dispensing tube 132 are located in the same (vertical) plane, with the axis of the dispensing tube 132 traveling also in the same plane.

According to a preferred realization, the connections of the link arms 164 and 168 to the dispensing tube 132 are located in the same (horizontal) plane, with the axis of the dispensing tube 132 travelling perpendicular to the plane.

According to a preferred realization, the link arms 164 and 168 are linked to the dispensing tube 132 on connection points located at the same level and at 180 degrees from each other relative to the circumference of the dispensing tube 132.

According to a preferred realization, the link arms 164 and 168 extend over the same axis.

Back to the flow control assembly 130 of FIG. 4, the first loudspeaker 162 acts as a driving loudspeaker 162 powered by a driving signal that drives movements of the dispensing tube 132. The driving signal is modulated to drive the dispensing tube 132 near the resonance frequency of the assembly composed of the two loudspeakers 162 and 166 and the dispensing tube 132. The second loudspeaker 166, the sensing loudspeaker 166, operates as a sensor, i.e., a microphone, that measures the movements of the dispensing tube 132 through the link arm 168 linking the dispensing tube 132 and the sensing loudspeaker 166. Each one of the driving loudspeaker 162 and the sensing loudspeaker 166 is connected to a controller (not depicted) emitting and transmitting driving signals to the driving loudspeaker 162, and receiving and interpreting sensor signals from the sensing loudspeaker 166, the closed-loop system comprising a controller (not depicted), the driving loudspeaker 162 and the sensing loudspeaker 166, whereby the system features feedback capability that allows to finely control the flow of material 90 passing through the flow control assembly 130 at all times.

Practically, as long as the material 90 exits fast enough from the dispensing tube 132, the sensor signal features characteristics (e.g., the amplitude, the frequency) which respect given values (e.g., the amplitude having a given value). When the bottom of the dispensing tube 132 starts to fill, i.e., at least partially hindering the exit of the powder 90 from the dispensing tube 132, the characteristics of the sensor signal change as the resonance frequency of the system evolves. With the filling of material 90 in the mold increases and the resonance frequency also changes.

Therefore, by using some signal post-processing through a controller connected to the driving loudspeaker 162 and sensing loudspeaker 166, it becomes possible to replace the existing imprecise powder dispensers with limited modifications in a way that improves the control of the flow of material 90 to the desired parameters at all times, avoiding both overfills and underfills. As an extra value, the movements transmitted to the dispensing tube 132, i.e., the shaking, help with the flow of material 90, helping in preventing the material 90 to clog.

Further, this solution provides the advantages of allowing to print in deeper molds, on built surface more distant from the dispensers 124 (see FIG. 6) and generally to have longer paths for the material 90. Such situations occur since the dispenser(s) 124 are of a considerable size relative to the build surface and thus the distance between them provides errors over the flow of material 90 when not controlled properly.

Another advantage of this design resides in the capacity of the system to more efficiently and precisely measure the amount of material deposited, and particularly when the deposition is relatively far from the material feed, i.e., the dispenser(s) 124 and the measure of the material dispensed by the dispenser(s) 124.

Referring now to FIGS. 8A to 11, some pieces of machine, such as piece 75 of the printing head of FIG. 3, have manufacturing requirements that go beyond the capabilities of current AMDs. Accordingly, the novel AMD 100 has additional capabilities that are described in relation with the making of the piece 75 of machinery as a nonlimiting example for the description.

More precisely, making the piece 75 requires filling a mold with different types of powders 90 in a specific geometry. To turn that non-final piece into the final piece 75 of a printing head, the non-final piece must be pressed and sintered.

Solutions that are available nowadays, such the use of a hydraulic press, would force the non-final piece to undergo a pressure of a maximum of about ten thousand (10,000) psi. Such pressure is far from the required constraints in relation with making the piece 75 that require a much higher pressure.

The present technique involves a novel kiln assembly 150 which, using thermal expansion, provides pressure of a maximum value well over the maximum value available with mechanically force pressure means. For instance, in order to make the piece 75, non-final piece, with the novel kiln assembly 150, may undergo a pressure value that may reach one hundred thousand (100,000) psi, two hundred thousand (200,000) psi or may even go beyond three hundred thousand (300,000) psi based on the structure of the novel kiln assembly 150, the material used, and the operational parameters selected.

The novel kiln assembly 150 involves the use of a passive material for columns 156 undergoing thermal expansion, and thereby applying pressure over the material of the non-final piece as temperature is increased to process the non-final piece with both thermal and pressure processing.

Referring particularly to FIGS. 8A, 8B, 8C, 8D, 8E, 9A, 9B, 9C, 9D and 9E, the novel kiln assembly 150 comprises a temperature controlled exterior frame 152 that is kept cold, which, according to a realization, is a heavy-duty steel frame 152 (see also FIGS. 10 and 11) of sufficient strength. The frame 152 is actively cooled down over its external face to keep the frame 152 at relatively constant temperature and thereby control the expansion of the frame 152 under a pre-set value.

According to an alternative realization (not depicted), the frame 152 is made of steel or aluminum plates. According to an alternative realization (not depicted), the plates of the frame 152 are 3D printed pieces made of appropriate material, for example of metallic powder and more precisely of recycled metallic powder or granules.

The kiln assembly 150 further comprises a kiln 140 that is built inside of the frame 152 with insulating bricks 154 of sufficient temperature rating (about one thousand and seven hundred degrees (~1700°) Celsius or more). Clearance is kept between the wall(s) of the kiln 140 and the steel frame 152. The clearance allows the insulating bricks 154 to expand thermally within a pre-set range. The built surface 142 of the kiln 140 is mounted to, i.e., sits on, the steel frame 152, with the top portion of the kiln 140 extending near the top of the frame 152 and having some space to expand. The top portion 146 comprises a moveable part that is mechanically independent from the rest of the top portion 146, for example a twelve-inch by twelve-inch (12"×12") section that can move up and down. The kiln 140 has a built surface 142 made of, or alternatively covered with, adequate material that thermally expands. The kiln assembly 150 further comprises a mold 158 that is placed on top of the built surface 142. A top layer of material that thermally expands and fits just inside the mold 158 is laid down on top, wherein the top layer has a function of pressing the mold. Finally, the moveable part 148 of the top portion 146 of the kiln 140 is placed on top. Final adjustments comprise adjusting in an exact manner the height of the combination by inserting thin steel plate(s) (of a size or quantity necessary to fill the space) between the steel frame 152 and the moveable part 148. In an alternative realization, a material different than steel having the desired characteristics, particularly resistance to pressure and response to heat, is used as alternative to the steel plate(s).

In an exemplary realization, the built surface 142 has an eight-inch (8") diameter, with the use of twenty-two-inch (22") long rod of alumina, with an eight-inch (8") outer diameter [O.D.] and a four-inch (4") inner diameter [I.D.], a four-inch (4") long tungsten ring filled with printed powder, then a four-inch (4") diameter, and with a twenty-two-inch (22") long rod of alumina on top.

Upon heating of the kiln 140, the alumina rods thermally expand, pressing against the powder and increasing the pressure within the kiln 140. The maximal pressure achievable depends in the realization on the compressive strength of the material that thermally expands. For example, for alumina, this is about two and a tenth (~2.1) GPa, which is well above the desired three hundred thousand (300,000) psi (see https://www.accuratus.com/alumox.html). With the present example, with a rise of one thousand degrees (1000°) Celsius, the alumina rods will expand over several millimeters (and even more if the kiln 140 is broader).

Figure 13:
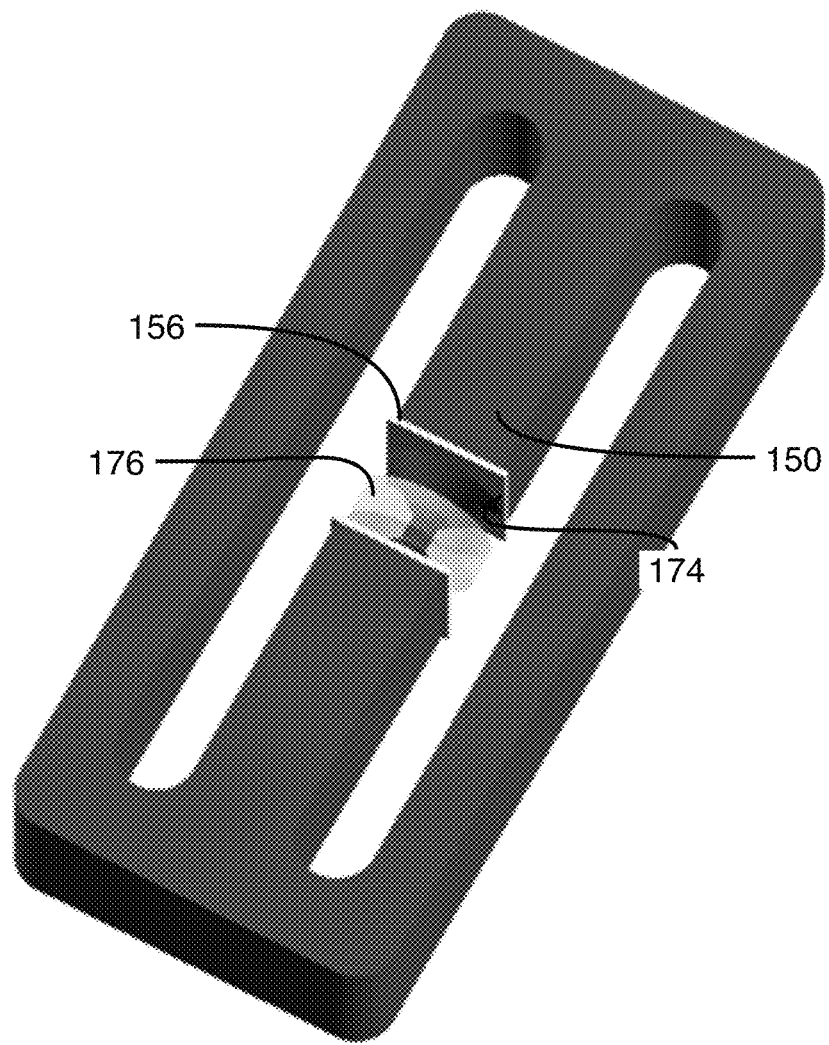
FIGS. 13 and 14 are respectively a perspective view and a top view of an exemplary assembly comprising pressing pieces.
Figure 14:
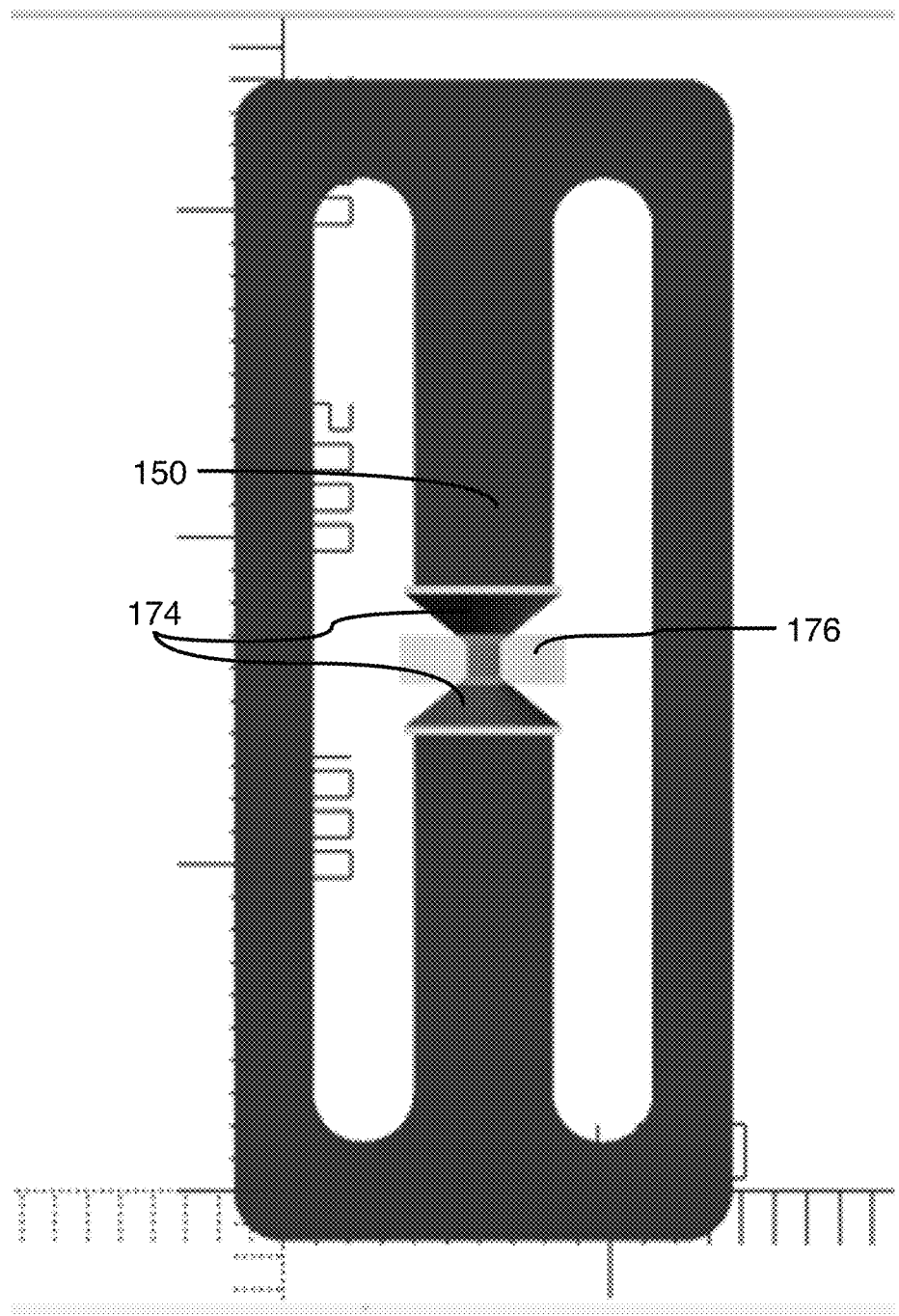

Referring to FIGS. 13 and 14, according to a realization, there is shown the use of pressing pieces 174 of a truncated conical shape contacting the mold 158 with its smaller extremity increases the pressure applied by the pressing pieces 174 over the mold 158, and thus over the material 90. According to an example, the pressing pieces 174 may have a larger radius of seven inches (7") and a smaller radius of two inches (2"), with the effective pressure undergone/applied between the extremities having a ratio of about twelve (12). For example, if the pressure undergone over the larger diameter of the pressing pieces 174 is fifty (50) MPa, the pressure applied by the smaller diameter will be about six hundred (600) MPa.

In another exemplary realization, the material selected to thermally expands is a less expansive material, with the pieces made of this expandable material, namely the twenty-two-inch (22") long rods of the previous example, having an increased diameter in comparison to the latter example. Material used for the mold 158 or between the parts of expandable material and the mold 158 may be selected among high-performance material such as boron carbide, wherein both parameters (material and diameter) improve the pressure value applied per unit of temperature increased in the kiln assembly 150. For example, by using the selected materials and dimensions, the kiln assembly 150 may apply a pressure of about six hundred (600) MPa over the material 90.

According to the latter realization, use of boron carbide, with is a conductive material, allows to heat the material through electric conductivity, thus independently from the temperature inside the kiln assembly 150. According to such a realization, the kiln assembly 150 is adapted with a current controller (not depicted) connected to a mold 158 made of boron carbide to controllably heat the material 90 while a controller of the kiln assembly 150 controls the expansion of the columns 156 (see FIG. 12) through a distinct process, wherein the kiln assembly 150 is adapted either through a single controller to control both aspects of the process or distinct controllers dedicated to the two aspects of the process. Thereby, the kiln assembly 150 may force the material 90 to undergo a high temperature while the columns 156 undergo a lower temperature. Such a realization allows to perform the process with the material 90 undergoing a temperature that would be substantially above the maximum temperature the columns 156 may undergo without premature wear. It further allows to select less expansive materials for the parts external to the mold 158 since the temperature they undergo may be substantially lower.

According to a preferred realization, both the outer face and the inner face of the mold 158 are made of or coated with boron carbide. The mold 158 may comprise a ring 176 (see FIGS. 13 and 14) made of high-performance material adapted to resist to outward pressure the mold 158 may undergo during the process.

In an exemplary realization, the temperature inside the kiln assembly 150 is increased to about two hundred degrees (~200°) Celsius to provide the appropriate pressure over the material 90 heated by electrification independently.

According to a realization, electrically non-conductive material is selected for the expandable material parts 156, or alternatively pieces of electrically insulating material (not depicted) may be placed between the mold 158 and the expandable material parts 156.

According to realizations with a lower maximum temperature in the kiln assembly 150 that needs to be reached, material for the insulating bricks 154 may be selected accordingly. For example, insulating bricks 154 designed for a temperature of a maximum of, e.g., about three hundred degrees (~300°) Celsius, may be selected with a working safety factor remaining in the design when the temperature in the kiln assembly 150 is designed to reach a maximum of about two hundred degrees (~200°) Celsius.

Figure 12:
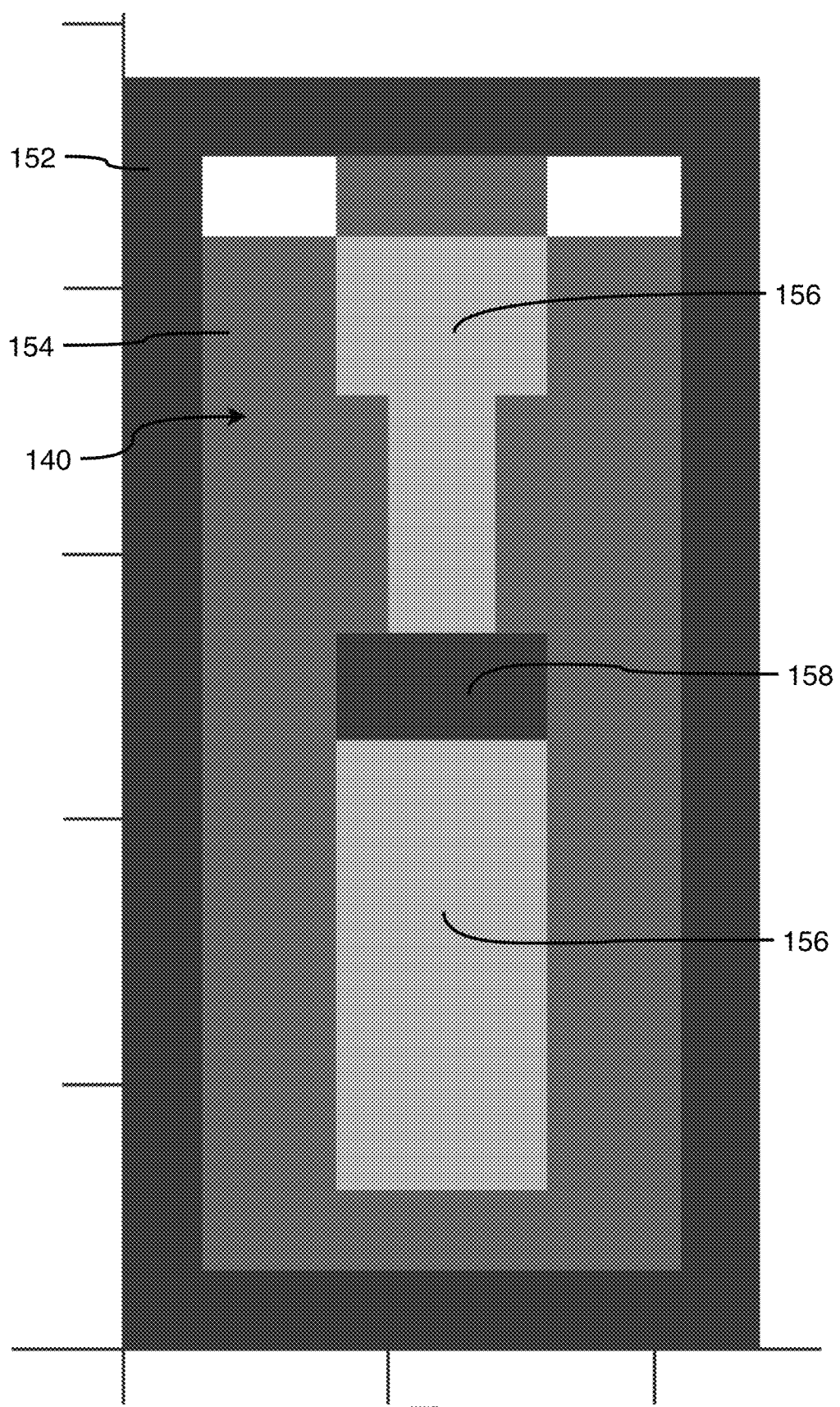
FIG. 12 is schematic of a compression assembly in accordance with an embodiment.

Referring to FIG. 12, parts of the kiln assembly 150 according to a horizontal cut passing though the mold 158 are schematically illustrated. The steel frame 152 (green) is actively cooled down to be kept at a relatively constant temperature and thus at relatively constant dimensions. Insulating bricks 154 (grey) are place within the enclosure formed by the steel frame 152. Alumina moving part 156 (yellow) are placed with the area limited by the insulating bricks 154. A powder-filled tungsten ring 158, aka mold 158, (red) in placed between the alumina moving part 156 and enclosed on two sides by the insulating bricks 154.

Therefore, the alumina columns 156 are wedged between the insulating bricks 154 and the tungsten ring 158 acting as a mold 158, with the rise of the temperature gradually increasing the pressure applied by the alumina columns 156 on one side over the insulating bricks 154 (retained in place by the frame 152) and on the other side over the mold 158 (i.e., the tungsten ring 158).

The kiln assembly 150 of FIGS. 9A-E further comprises, according to realizations, graphite rods 172, aka heating elements 172, used to heat the kiln assembly 150; inlet(s) (not depicted) adapted to feed the kiln assembly 150 with a supply of inert gas, and thermocouple(s) and/or pyrometer(s) (not depicted), at least one of any of the two, and a total number determined based on the dimensions of the kiln assembly 150, are mounted in the kiln assembly 150 to sense the temperature therein and connected to a controller (not depicted) able to control the current in the graphite rods 172 that heat the kiln assembly 150 up at the desired temperature.

According to a realization, the kiln assembly 150 may operate on a same non-final piece over a number of cycles to gradually increase pressure applied on the powder as the powder compacts. The number of cycles may sum up to two or more of such cycles, with plates (not depicted) being added before subsequent cycles to compensate to the compaction of the additive material in the mold 158 during the previous cycle.

According to a realization, the plates, aka shim plates (not depicted), may be inserted on top as described and additionally somewhere between the mold 158 and the expandable material parts 156.

In cases in which the additive material 90 tends to stick to the built surface 142 when the kiln assembly 150 reaches its top temperature or maximum pressure according to the design constraints, the design of an article may comprise sacrificial layers of material to be sawed off from the article once the article is removed from the kiln assembly 150. Likewise, the contacting face between the article and the tungsten ring 158 can be cut with a hole saw of appropriate size once the article is removed from the kiln assembly 150.

According to a realization, the whole apparatus is made to operate under inert atmosphere.

According to a realization, heating elements such as graphite rods or other appropriate heating elements capable of reaching sufficiently high temperature are used to control temperature in the kiln assembly 150.

According to a realization, the control of the temperature of the frame 152 is performed by controlling a flow of refrigerating fluid, e.g., water, over the external face of the frame 152.

The use of the present kiln assembly 150 provides the advantages, over existing apparatuses, of operating under much higher temperature and pressure values, which allow fusing much more refractory powder or materials that would not be able to fuse under normal methods. This is required to create a piece 75 or other articles that are capable of reaching extremely high working temperatures or alternatively that are able to operate in extremely high temperatures conditions.

Embodiment Using Active Pressure

Figure 18:
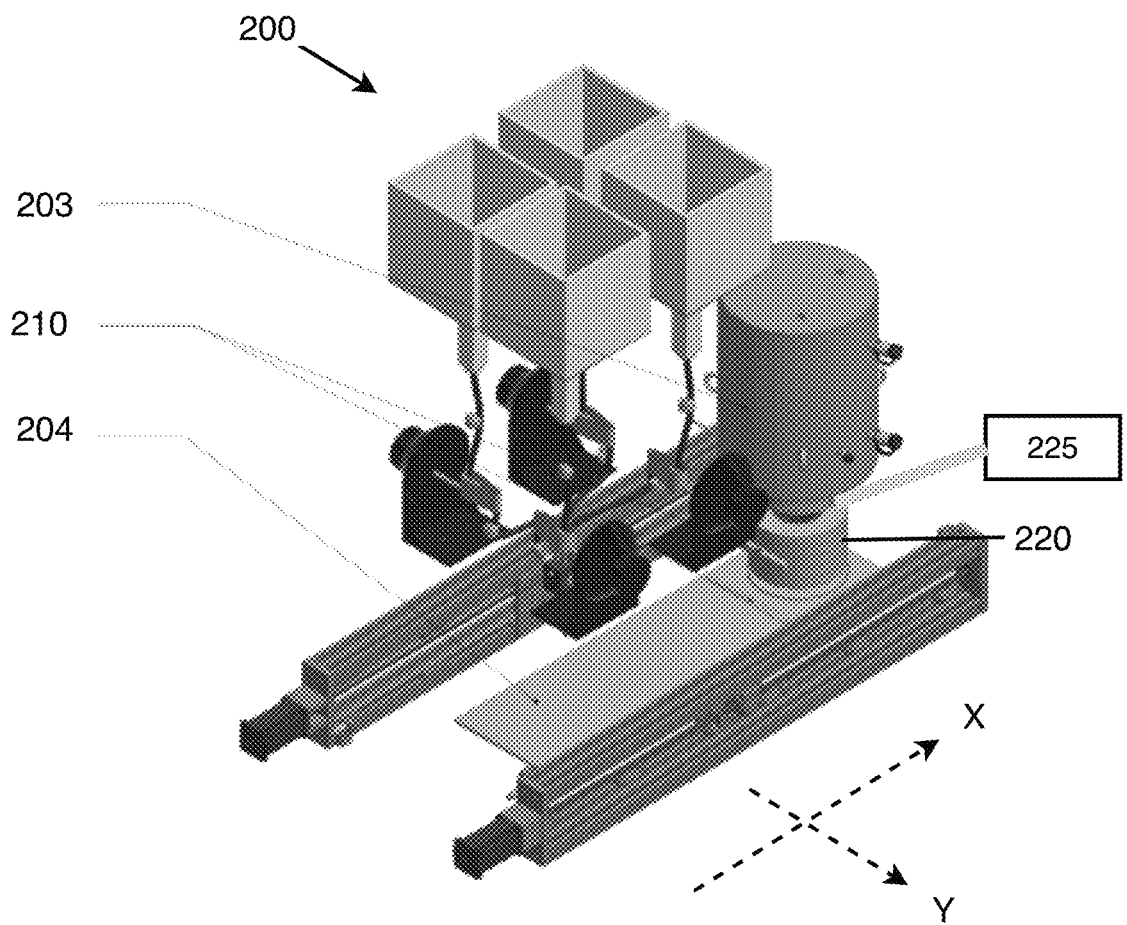
FIGS. 18, 19 and 20 are respectively a perspective view, a front view and a side view of an additive manufacturing device (AMD) in accordance with another embodiment.

According to an alternative embodiment, an AMD 200 (FIG. 18) is adapted for depositing powders of different materials in a mold, layer-by-layer, and afterwards pressing and heating in which the different densities of the materials will not cause turbulence that may dramatically alter the shape of the intended object. Accordingly, the AMD 200 is well adapted for pressing/heating between each layer.

Using the AMD 200, the manufacturing operation allows the AMD 200 to switch functions between one of a high-pressure/high-temperature press and one of a powder deposition 3D printer between each layer. Since the powders 90 are pressed much more often than with the first embodiment, the approach of using thermal expansion to press is replaced with a physical press process performed between layers. The amount of energy and time saved using the AMD 200 and compared to the AMD 100 and kiln assembly 150 is substantial. With the AMD 200, a high-tonnage hydraulic cylinder 203 is now used to close a pressurized gas container 220, which is then pressurized by injecting inert gas using a compressor 225 (e.g., https://www.highpressure.com/products/sprague-pumps-systems/etensifier/, max 36.5 kilo psi or kpsi, see FIG. 18 for schematic depiction) to a higher pressure than what the hydraulic cylinder 203 can provide alone. According to examples, the compressor 225 provides at least 20 kpsi, and preferably at least 30 kpsi, and more preferably at least 40 kpsi, which in perspective is more than 3 times, and up to 4 times, the maximum pressure generated by the hydraulic cylinder closing the pressurized gas container 220, aka mold 220. The combination of physical closing and gas-based pressing neatly solves the potential issue of the object sticking to the press, i.e., the hydraulic cylinder 203 or a part connected thereto. It further allows use of a heating element 260 (see FIGS. 41 to 43) that does not contact the object being fabricated and further increasing the pressure once the gas inlet valve (e.g., rated for 60 kpsi or more) is closed, potentially to a higher pressure than the compressor rated limit.

Figure 41:
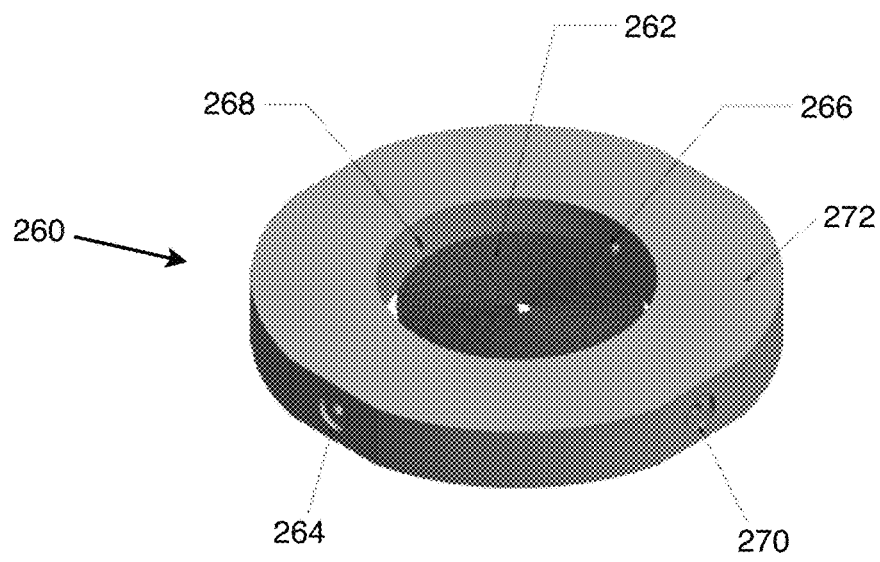
FIGS. 41 to 43 are respectively a perspective view, a top view and a side view of a heating element in accordance with an embodiment.
Figure 42:
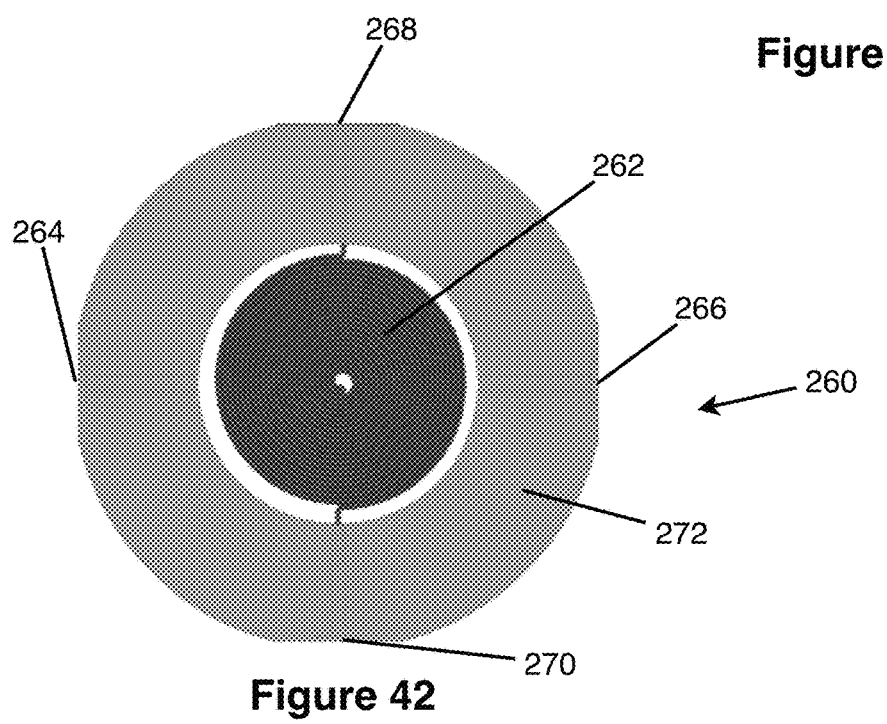
Figure 43:
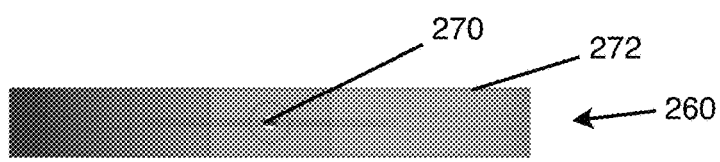

Referring particularly now to FIGS. 41 to 43, the heating element 260 comprises a heating coil 262 connected at one end to an electric inlet 264 and at its other end to an electric outlet 266. The heating element 260 further comprises a gas inlet 268 and a gas outlet 270 to which are connected to a compressor 225 and valves to place the mold into and out of the pressurized gas container state.

Figure 19:
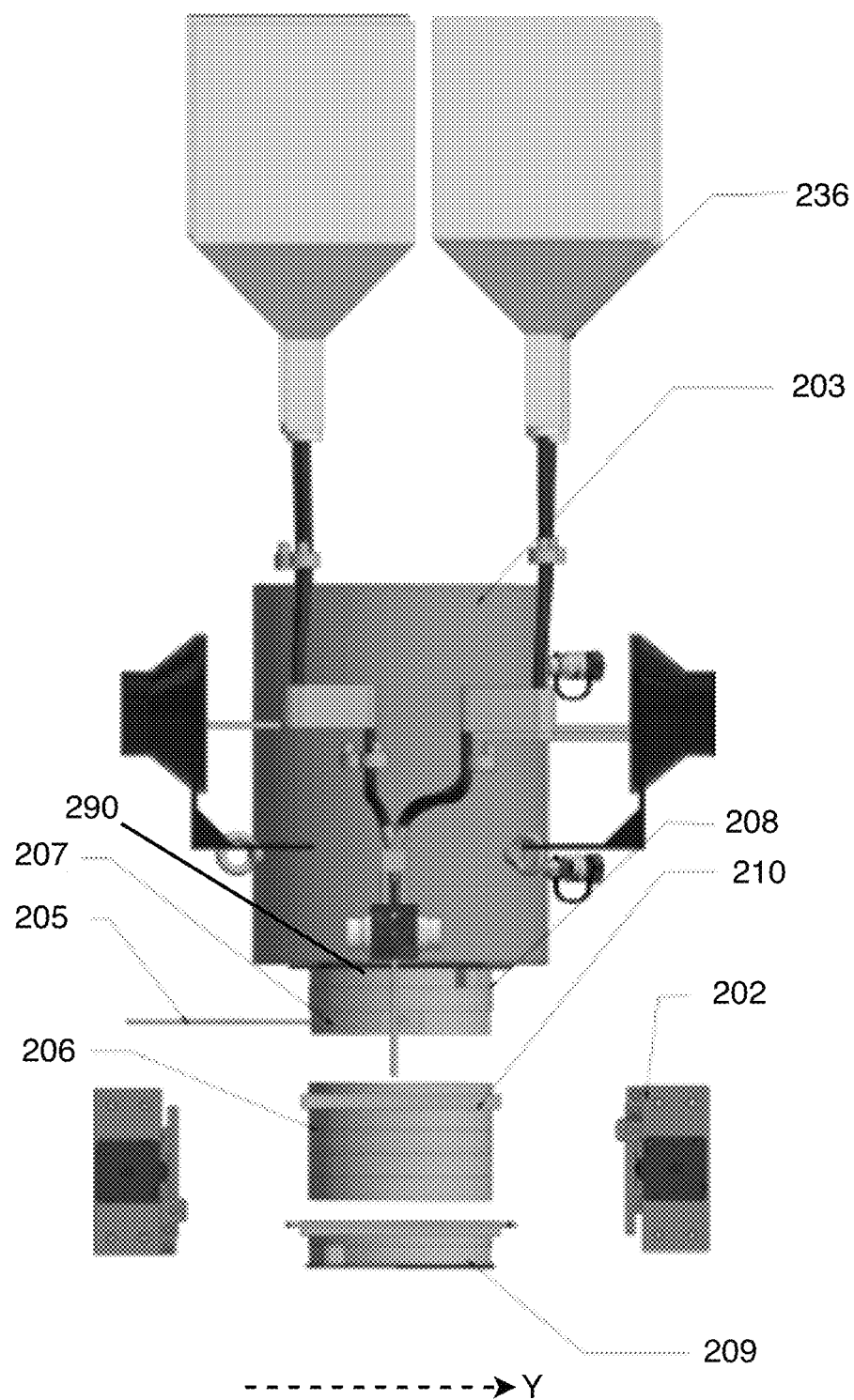

The heating element 260 typically consists in one of the plates of the mold 220, and preferably one plate pressed against the open top of the mold 220 to close the mold 220, According to a realization depicted, e.g., on FIG. 19, the heating element 260 is part of or embodies the output plate 207 pushed against the mold 220 by the hydraulic cylinder 203.

To minimize the cost of manufacturing, the design of the mold 220 was altered relative to the kiln assembly 150 so the pressurized gas container, aka mold 220 is made up of several metal or higher performance materials, plates 206, with metal gaskets (not visible, not identified) installed between each of them thus reusing current industrial capabilities.

With the present manufacturing process, since the surface of the pressed and heated powders may still be hot between layers, vibrating straws 235 depositing the powders comprise tiny cooling conduits 250/252 (FIGS. 23 to 30), and a metal foil umbrella 280 (FIGS. 44 and 45) is used to protect the straw holding part.

According to a first realization, the straws 235 are made of aluminum.

According to an alternative realization, a platinum-family version of the straw 235 is used since the latter may operate as an electrolysis electrode into molten raw material of a 3D printing hot-end, using molten metal as cooling material for high temperature operation.

Figure 44:
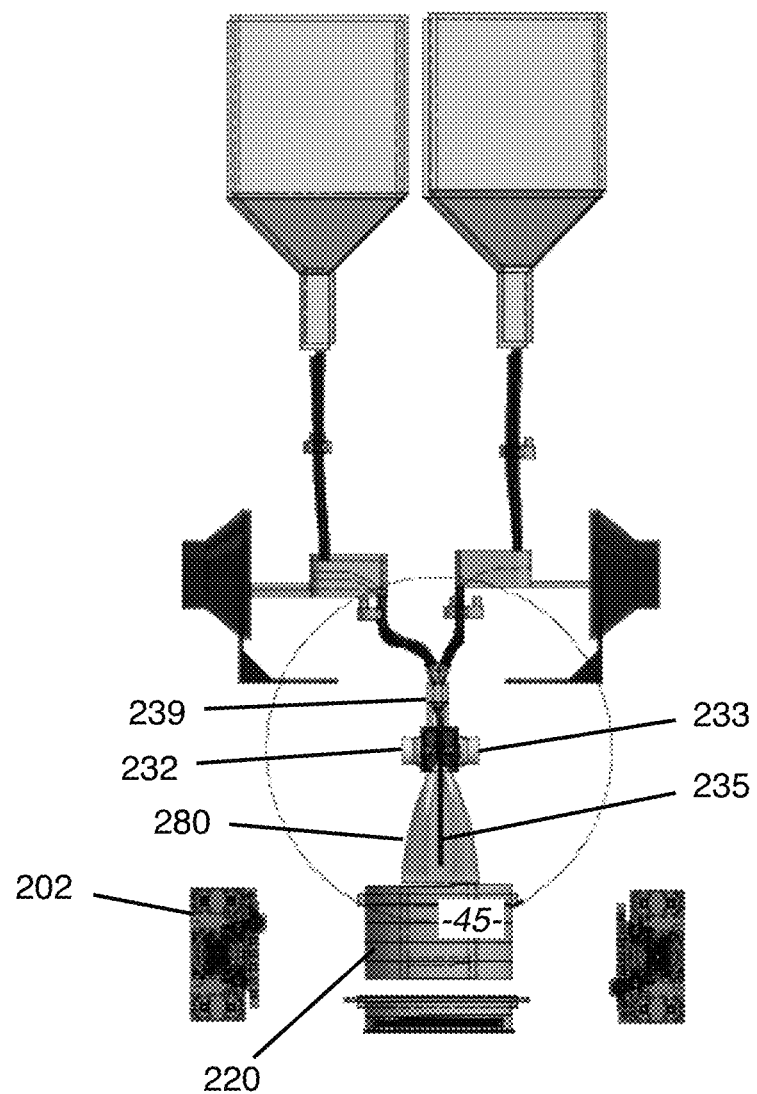
FIGS. 44 and 45 are respectively a front view and a close-up view of the material deposition station of the AMD of FIGS. 18 to 20 with a metal foil umbrella mounted thereto.
Figure 45:
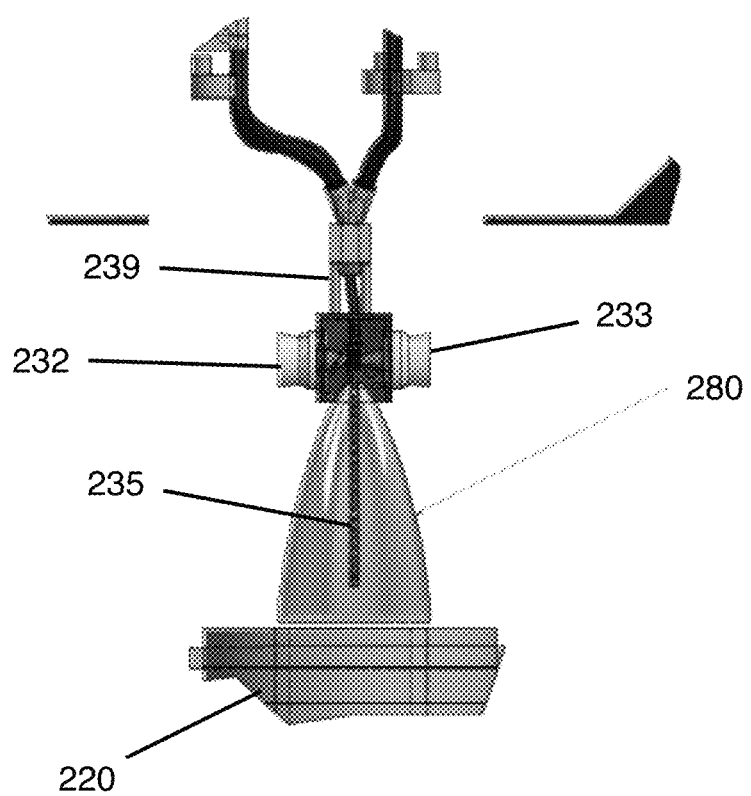

Referring particularly to FIGS. 44 and 45, the metal foil umbrella 280 extend from the assembly comprising the speakers (232, 233) and through which extends the straw 235 under the mixing part 239. The metal foil umbrella 280 extends in an ogive-like shape to have its base having a diameter covering a substantial portion of the top opening of the mold 220.

According to selected manufacturing process, the AMD 200, considering that the operating pressure and heat in which the AMD 200 may operate make it possible, the manufacturing process allows depositing precursors of the target material for in-situ material production.

For example, a properly mixed amount of tantalum (Ta) and carbon (C) can be deposited in a specific geometric configuration (with filler material around), with a programmatically variable number of other elements, so that when the deposited material is pressed and heated, it chemically reacts to become the target material (TaC) that itself might be too refractory for direct sintering.

During testing, it was found that some material would generally refuse to stick together. By doing layer-by-layer multi-material fabrication using the present AMD 200, it is still possible to mechanically bind them together using 3D printed interlocks, i.e., interlocking parts fabricated together in the same mold 220, that could not be produced separately then assembled.

Further, a camera 244 (FIG. 16) directly pointing to the transparent flexible tubing part holding the straw 235 is used. Information from the camera 244 is used so that machine-learning can correlate the grains of material 90 being filmed with the mass-rate of powder deposition, for a more finely tuned process.

To prevent the translated mold 220 from sticking to the press apparatus, aka hydraulic cylinder 203, graphite (or other lubricant) filling brushes (not shown) are used, wherein the brushes are moved in the path of the moving mold 220 as to deposit a thin layer of lubricant on the container surface between each translation of the moving mold 220.

Figure 15:
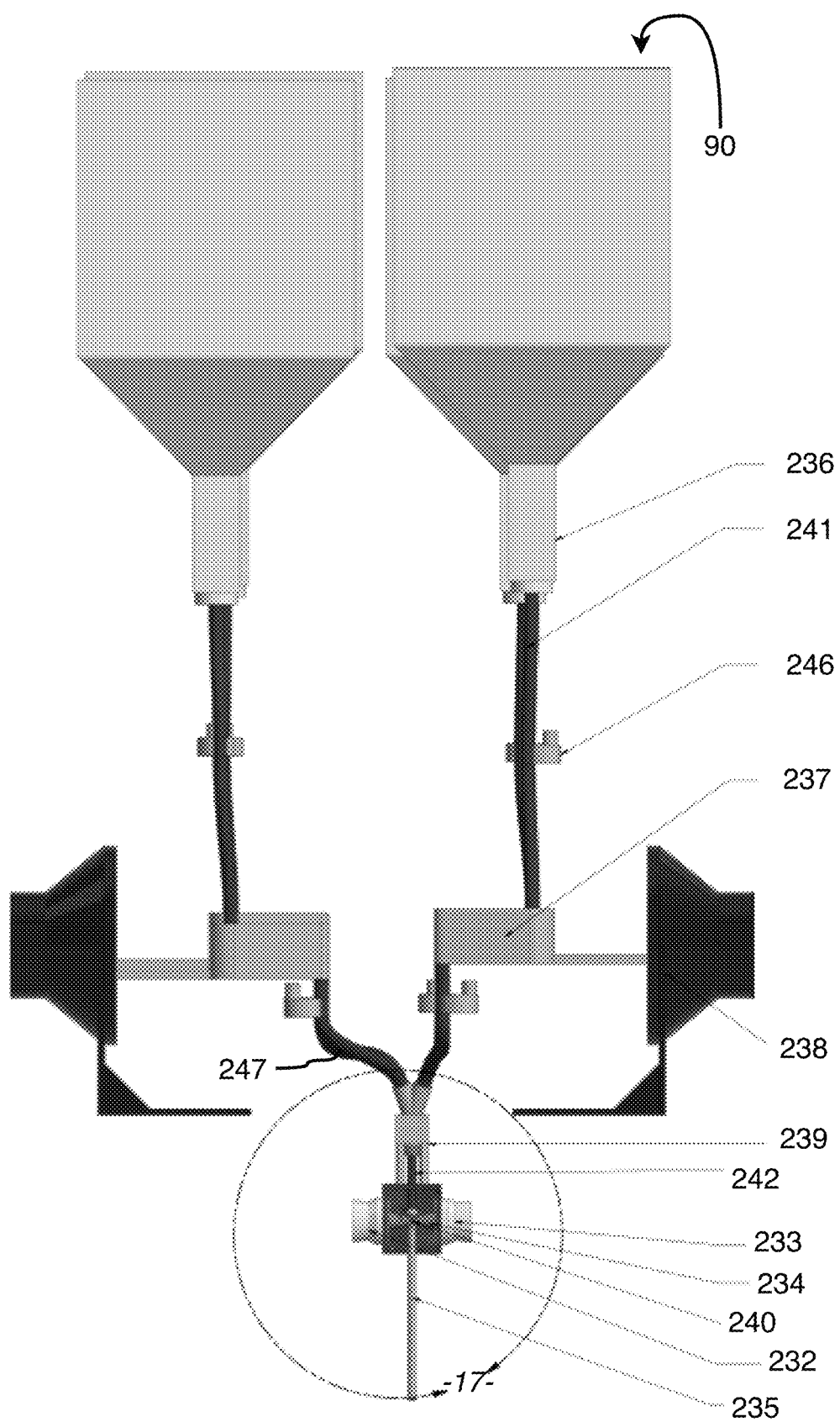
FIGS. 15, 16 and 17 are respectively a front view, a side view and a close-up view of the material deposition station of the AMD of FIGS. 18 to 20.
Figure 16:
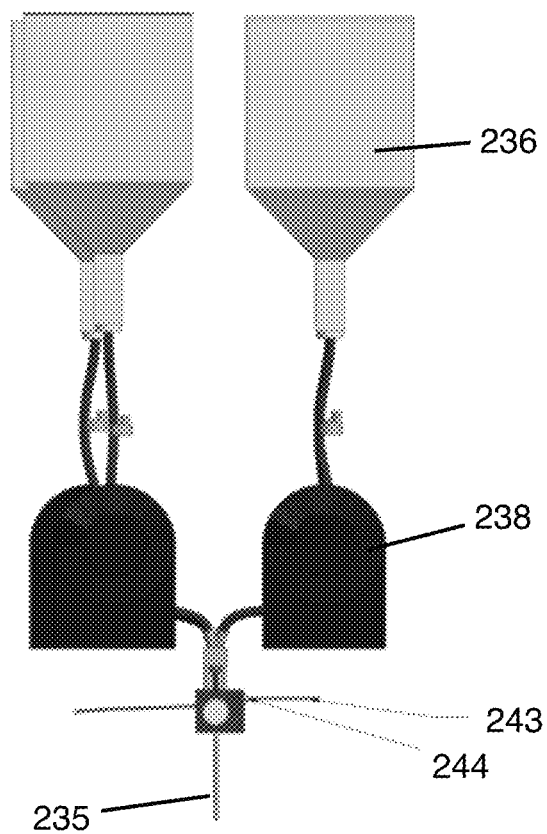
Figure 17:
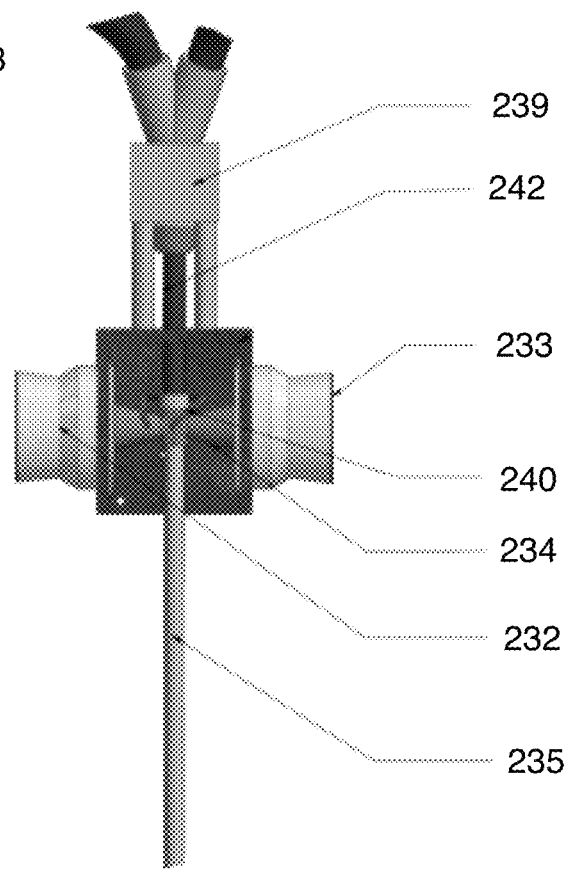

Referring now to FIGS. 15 to 17, the AMD 200 comprises a variable number of reservoirs 236 that contain raw material 90 (powders/granules). The reservoirs 236 are positioned at the top of the AMD 200 to use gravity to drive the flow of raw material 90. The bottom part of each reservoir 236 is connected to a guiding tube 241 having a vibrating part 246 connected thereto. According to an embodiment, the vibrating part 246 is a simple small motor with an unbalanced weight. The other end of the guiding tube 241 is connected to a flow-controlling part 237 (aka a flow controller) that stops the flow by its geometry unless shaken by a linear motor 238. Another guiding tube 247 then goes into a mixing part 239 (aka a mixer) which combines all the different source materials from the different reservoirs 236. The output of the mixing part 239 goes into a semi-flexible transparent tube 242 and then into the actively-cooled straw 235, for depositing into the mold 220. The straw 235 is cooled by a coolant fluid (liquid or gas material) via connected cooling tubes 240. The straw 235 is further vibrated via a pair of speakers (232, 233), one driving speaker 232 and one sensing speaker 233. The speakers (232, 233) are mechanically linked to the straw 235 via a 3D printed part 234. A camera 244, connected via wire 243, monitors the transparent tube 242.

Figure 20:
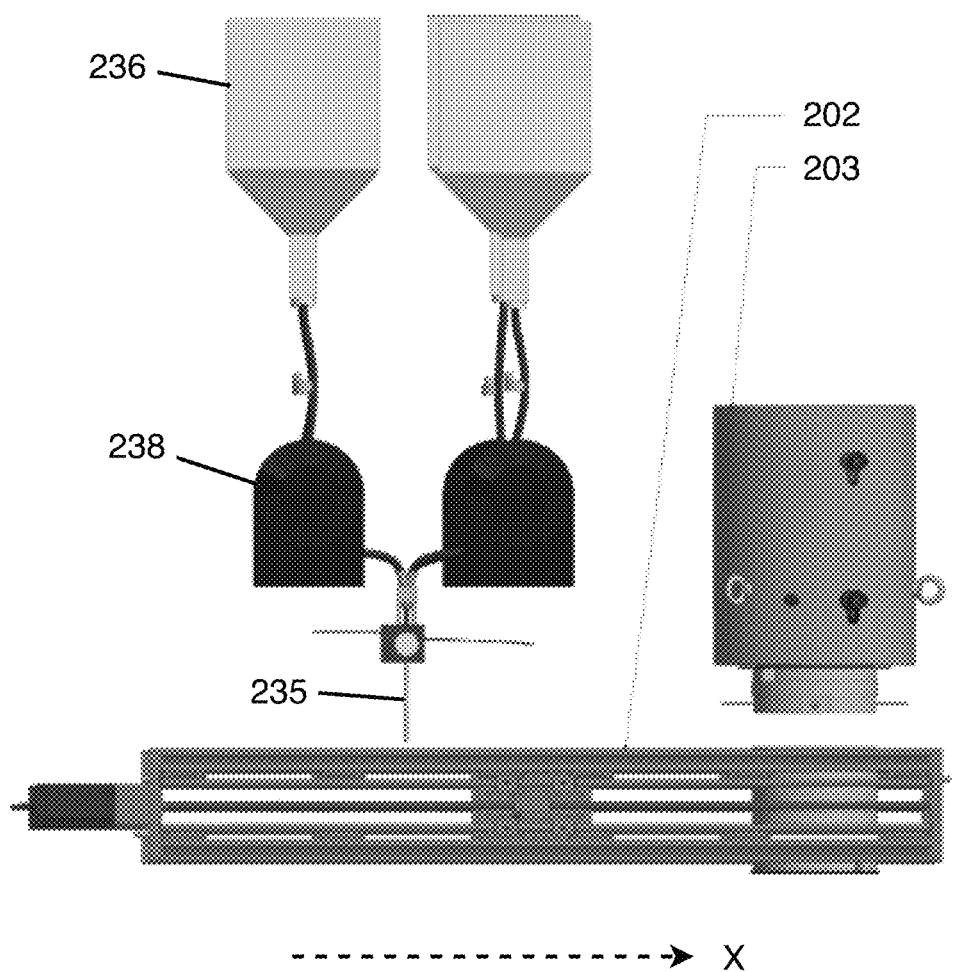

Referring again to FIGS. 18 to 20, the AMD 200 is depicted next to a high-tonnage cylinder 203. The mold 220 receiving the powders 90 is mounted onto a sliding plate 204 whereby the mold 220 translates in X-Y plane for the mold 220 to switch between the powder deposition operation and the pressurizing, heating and sintering/high-temperature synthesis operation.

The mold 220 comprises graphite filling parts 210 (e.g., graphite-impregnated packing seals). The resulting pressurized container, aka mold 220, is made from multiple plates 206, comprising a top cooling plate 290 (see also FIGS. 46 and 47) and a bottom cooling plate 209, pressure diffusing plates 208, and an input/output plate 207 with connectors 205 for electricity/gas. Thus, the movable mold 220 is made from a stack of plates 206.

During its operation, the mold 220 is moved, through motion of the plate 204 by two motorized rails 202, or another appropriate method.

Figure 21:
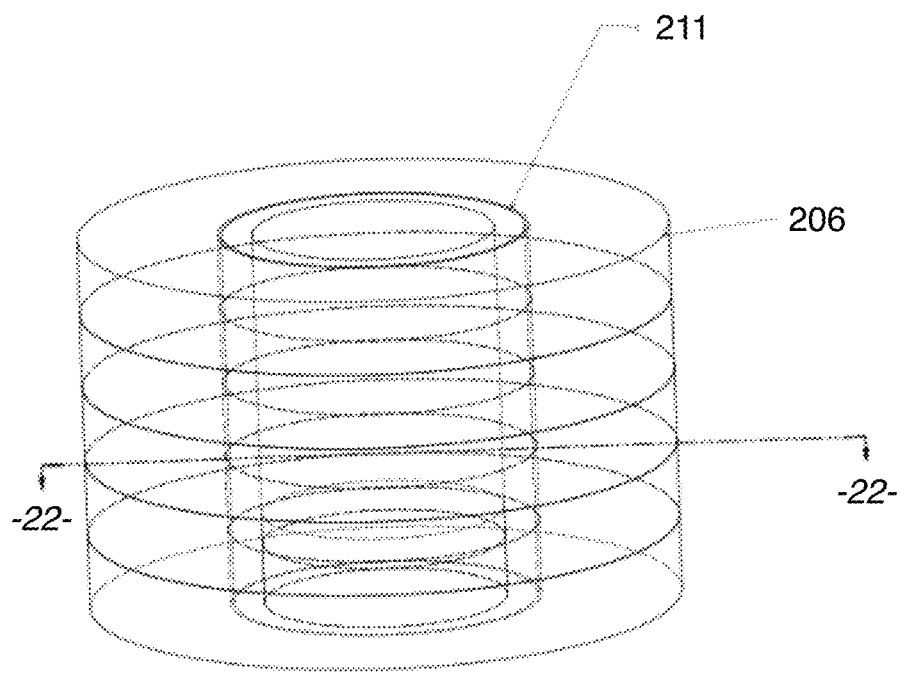
FIGS. 21 and 22 are respectively a perspective view of a mold of the AMD of FIGS. 18 to 20 and a cross-section view of the mold of FIG. 21 according to line 22-22.
Figure 22:
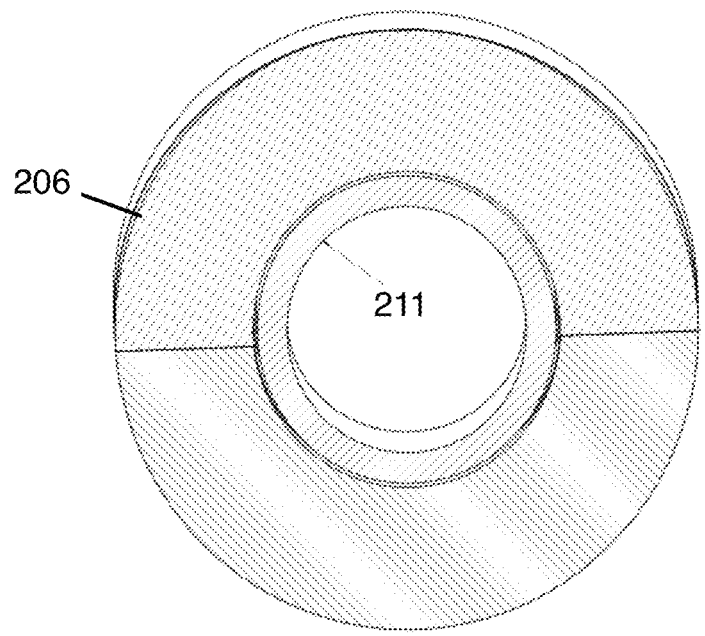
Figures 28, 29:
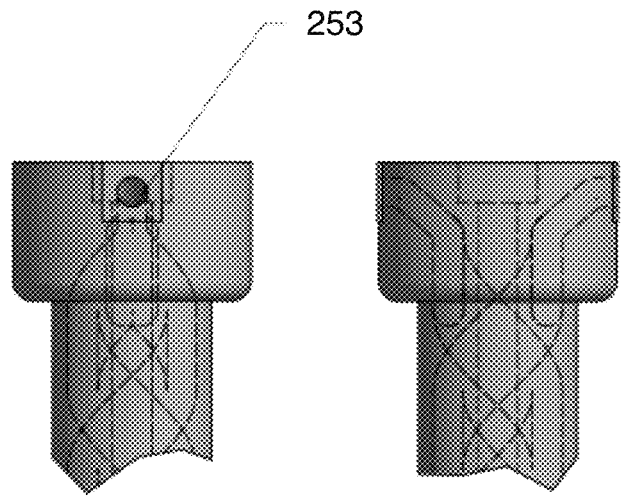
Figure 30:
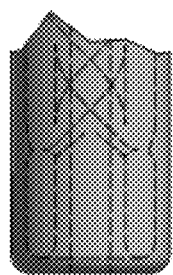

Referring to FIGS. 21 and 22, the moving mold 220 contains a refractory sleeve 211 to protect the containing plates 206.

Referring to FIGS. 23 to 30, the straw 235 comprises a conduit 252 for powder/granules, one or more cooling conduits 251 for circulation of gas or liquid for actively cooling the straw 235, and associated interfaces 253 for connections.

According to a realization, the straw 235 is a 3D printed part.

Figure 46:
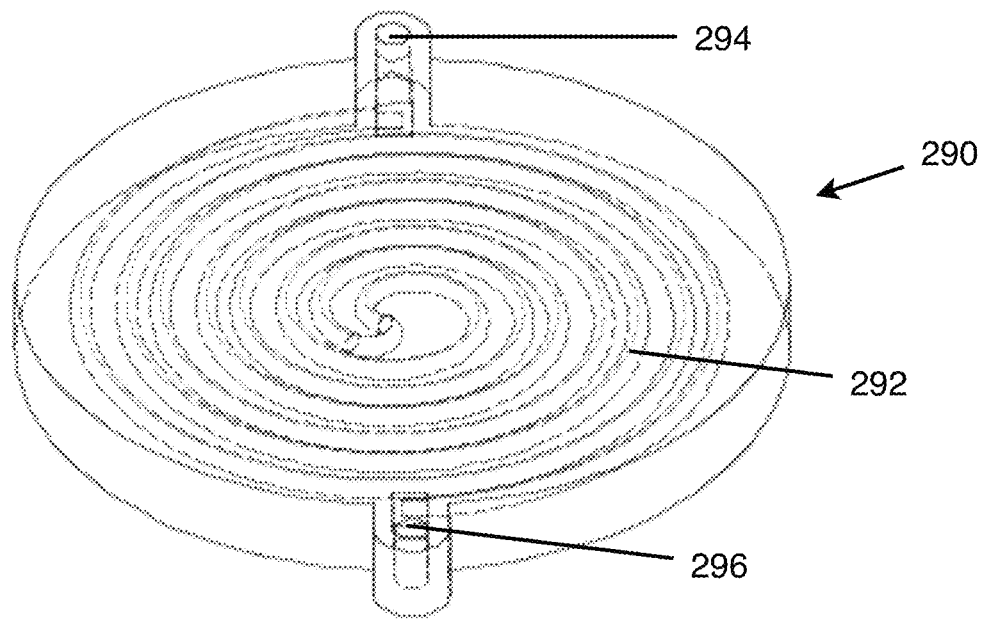
FIGS. 46 and 47 are respectively a perspective view and a top view of a top cooling plate of the mold in according with an embodiment.
Figure 47:
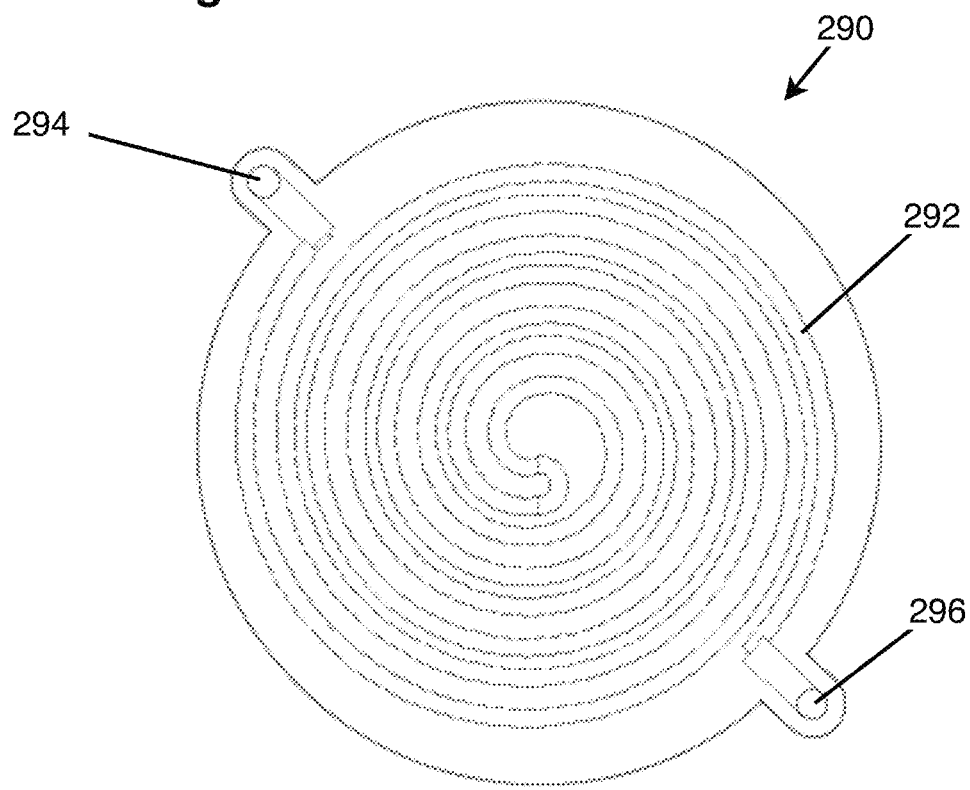

Referring to FIGS. 19, 46 and 47, the cooling plate 290 comprises a cooling conduit 292 defining a coil over the surface of the of the cooling plate 290. The cooling conduit 292 ends with an inlet 294 and an outlet 296 to be connected to a cooling system, thereby circulating cooling fluid in the cooling plate 290 when needed. The cooling plate 290 is typically mounted between the heating element 260 and the hydraulic cylinder 203, for example on top of the position pointed by arrow 208 on FIG. 19.

The use of the present AMD or assembly may further be described as a method. The method comprises to lay down a layer of material in the mold 220, to close the mold 220 using the hydraulic cylinder 203, and injecting pressurized gas, preferably inert gas, into the mold 220 to obtain a pressurized gas container 220. The method further comprises heating the material present in the mold 220 thus increasing even more the pressure and sintering/high-temperature synthesizing the material into its final state. The method comprises to have the temperature in the mold 220 decreasing, depressurizing the mold 220, and opening the mold 220 by lifting the pushing portion of the hydraulic cylinder 203 off the mold 220.

The method comprises to repeat the process by depositing another layer of material over the previous one and repeating the other steps such as to build layer by layer the final object by repeatedly depositing layers over a last layer sintered/high-temperature synthesized in its final state and sintering/high-temperature synthesizing that last layer.

Shipping Container Realization

According to a particular realization, when the raw powders used to fabricate objects are expected to be sensitive to oxygen, the whole process is integrated in a large container 300 with slightly reduced atmosphere. Indeed, the whole system is designed to fit a single 20' maritime shipping container 300 (easy to transport by boat/helicopter, and also fits modern launch vehicles such as Starship by SpaceX).

Since it would be prohibitive to inject inert gas into such a big volume every time it is opened (to collect the 3D printed object), a water-electrolysis system is included, using High-density polyethylene (hdpe) pipes and common material electrodes, in a configuration that could easily scale to much bigger containers. Platinum coated silica beads and/or platinum foils make the generated H2 gas immediately react with oxygen to generate water that can be collected. The generated O2 is sent outside. For the 20' shipping container 300, it is expected that removing nearly all the oxygen would use moderate power and kilograms of water, in a reasonable amount of time. To provide the raw amperage, high-volume produced power supplies can be used: even though not very precise in the power they provide, they are quite cost-effective in terms of price per ampere.

The shipping container 300 would also include a 3D printer to use the 3D printed press-sintered object, enabling both the creation of the critical part of the extruding hot-end and its use, inside the same oxygen-free atmosphere (e.g., for 3D printing aluminum or other material). For other materials that can be extruded in the presence of oxygen, or for deployment in oxygen-free environment (e.g., Moon, Mars, etc.). While the shipping container volume restricts the maximum size of the deployable 3D printer, with some minimal assembly once deployed, the capability of the deployed 3D printer could be increased to about 20' in length, 20' in height, whatever length large-scale 3D printed objects (e.g., buildings), provided the raw materials are brought to the printer.

For such large-scale endeavors, a variant of the extruding hot-end using a 10" (or more) high heating head for AMD described in patent application PCT/CA2020/051555 from the same inventor. instead of a 4" high heating head for AMD could be used. That would allow more surface for heat generation and transfer. The extruding hot-end implementation was designed explicitly for variable scaling, allowing such variance in size by simply swapping common ¼" NPT tubes of different lengths.

Figure 31:
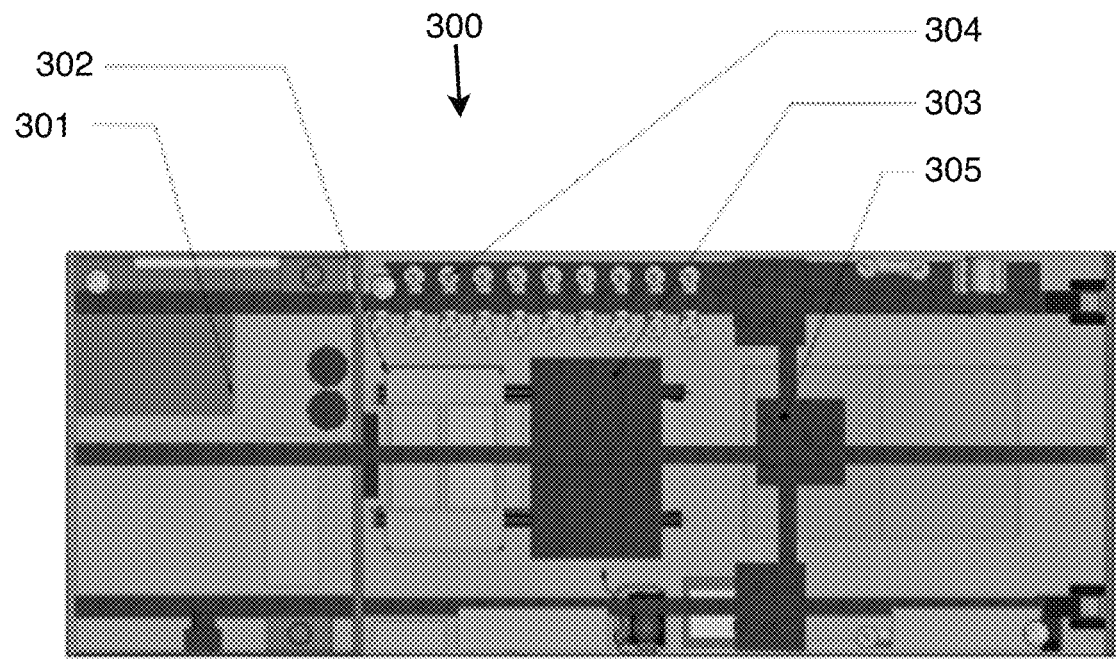
FIGS. 31 to 33 are respectively a top view, a side view and a perspective view of a shipping container comprising an AMD in accordance with an embodiment.
Figure 32:
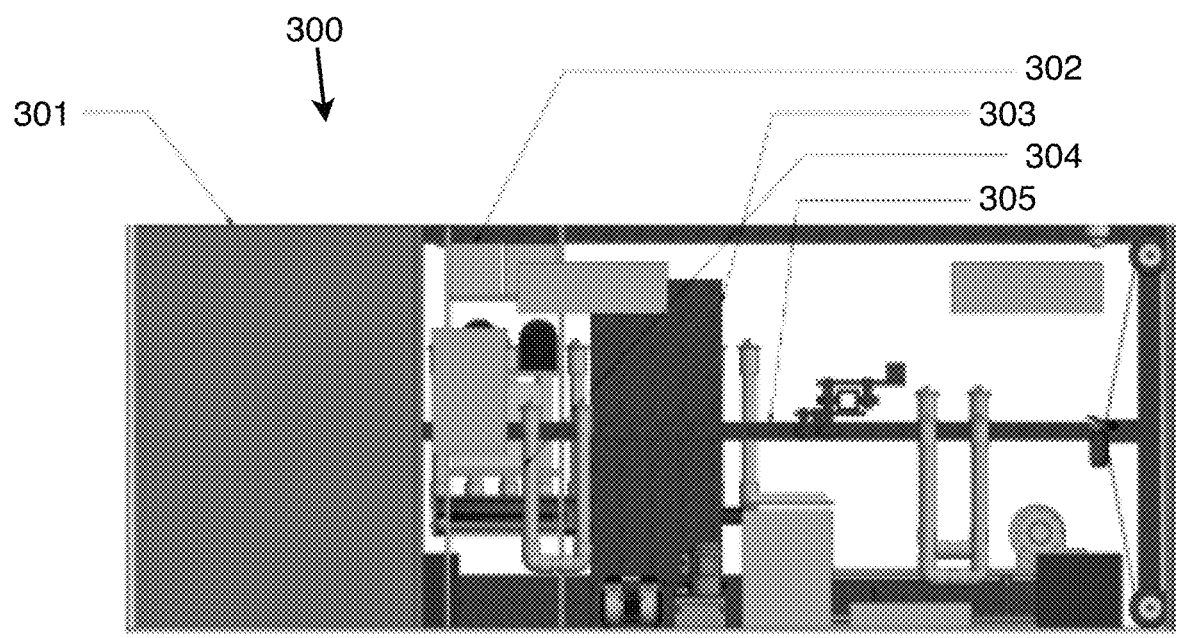
Figure 33:
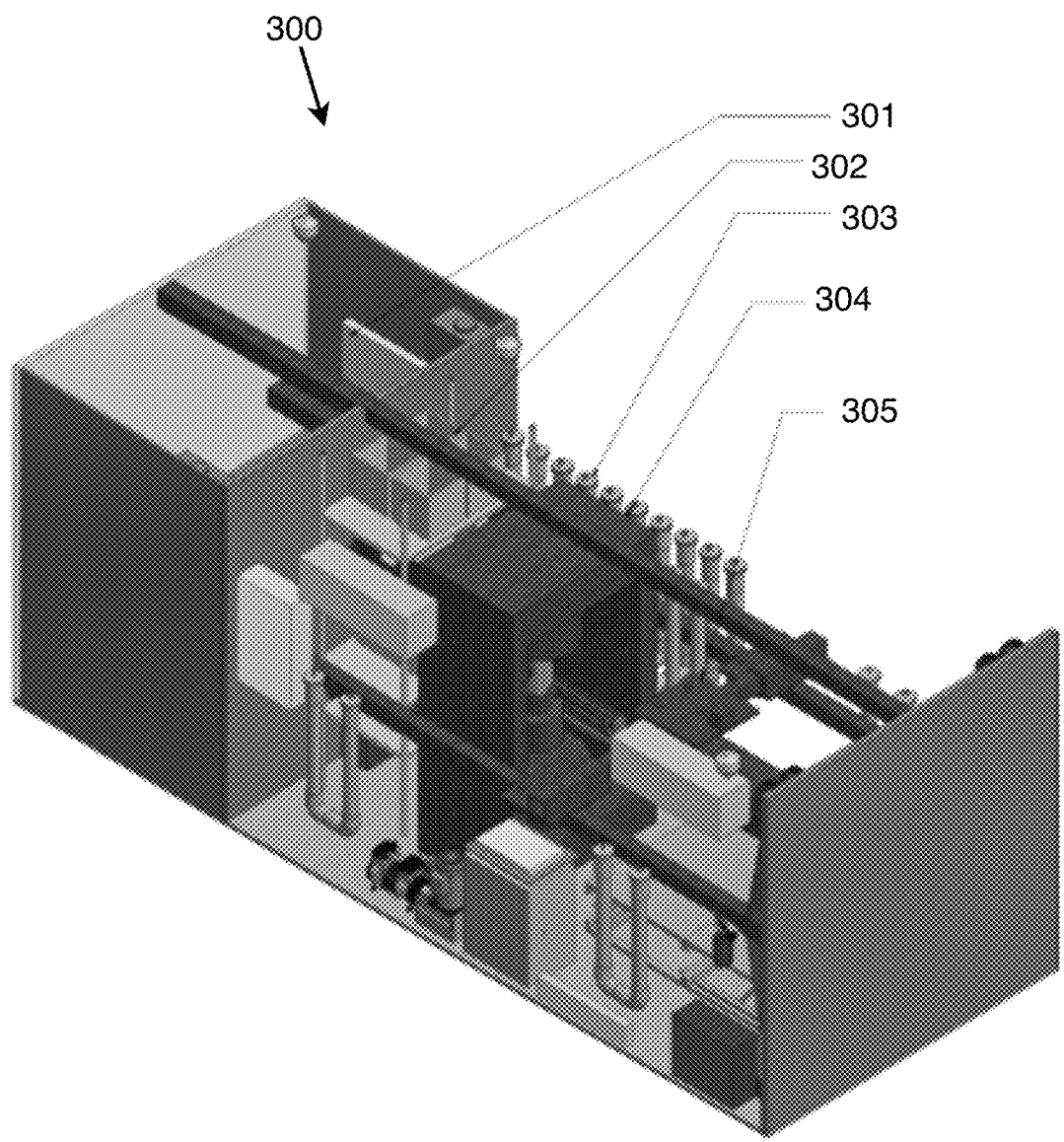
Figures 34, 35:
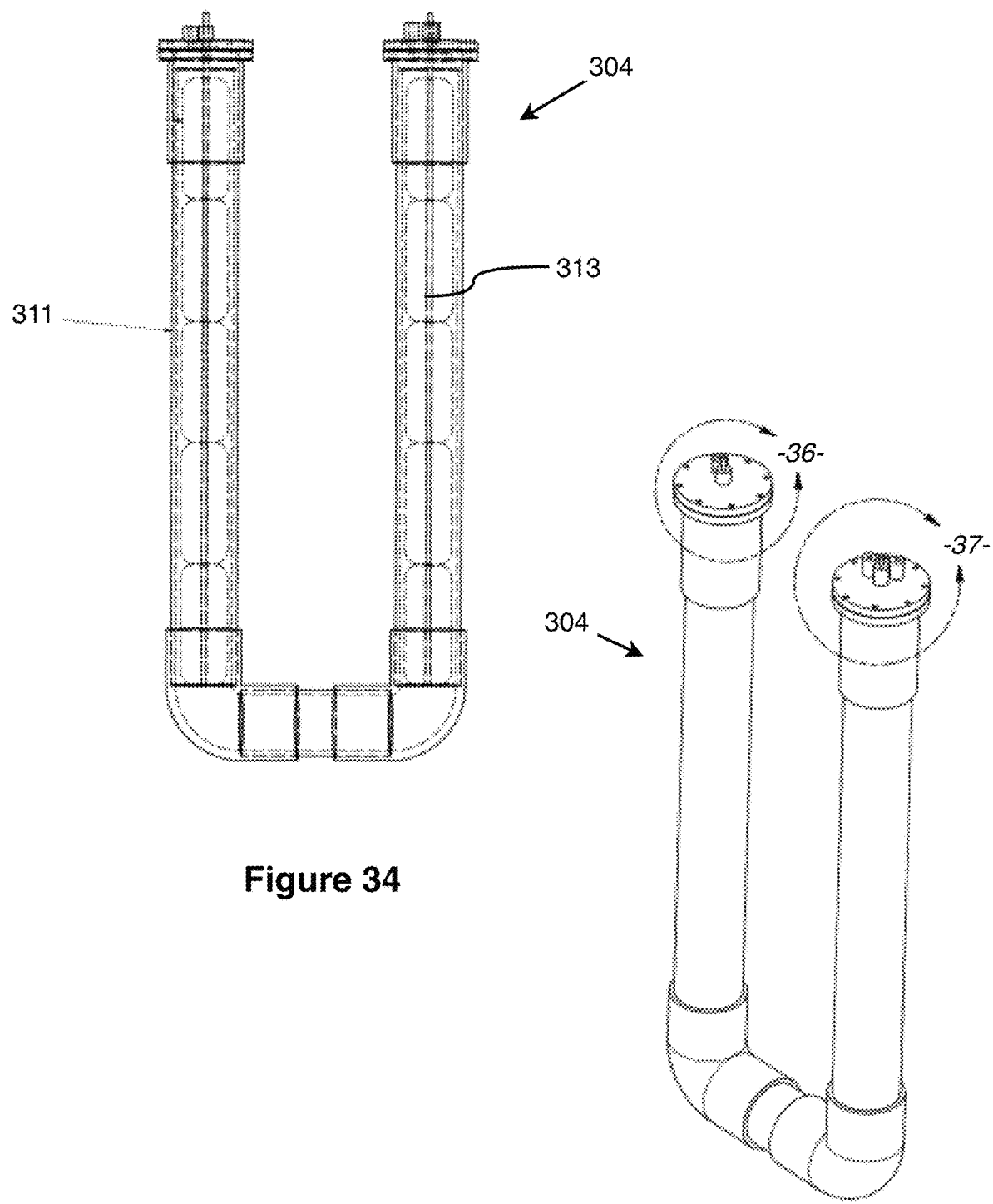
FIGS. 34 to 37 are respectively a front view, a perspective view and close-up views of the first and the second cap of a water electrolysis component in accordance with an embodiment.
Figure 36:
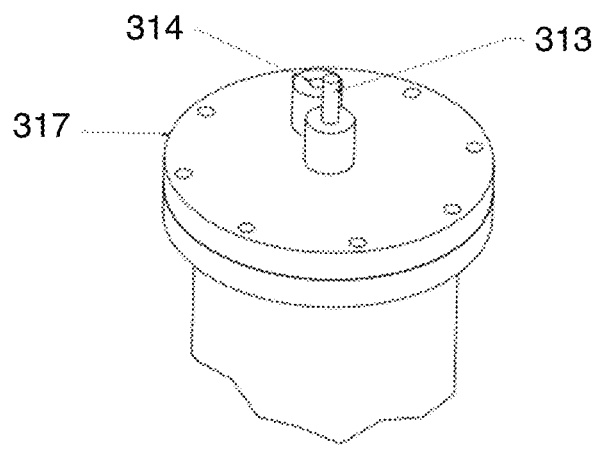
Figure 37:
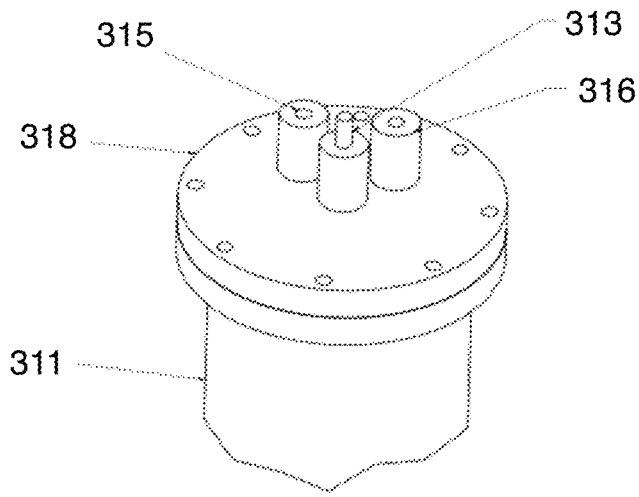
Figure 38:
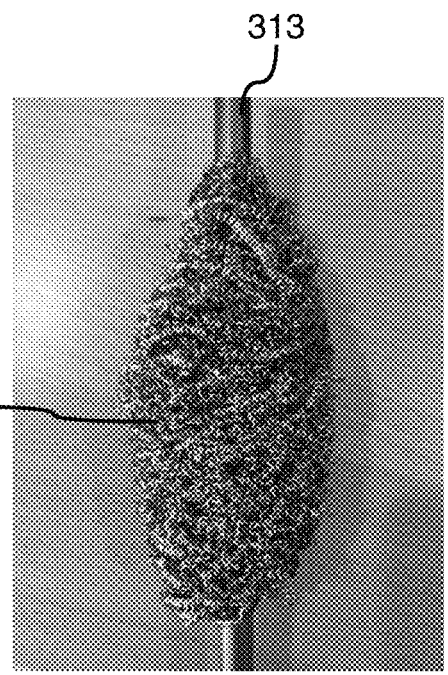
FIG. 38 is a picture of a metal rod with a metallic wrapping.

Referring now to FIGS. 31 to 33, the planned shipping container 300 includes water-electrolysis components 304 to do water electrolysis: more of those can be added as needed to cover quicker ejection of oxygen of for bigger enclosures (e.g., a 40' container). Section 301 of the container 300 is reserved for human operators where oxygen is not removed. The material deposition station 302 is close to the press or heating/sintering/synthesizing station 303 which is roughly kept near the center of the shipping container 300 for easier transport, as it is the heaviest component of the container 300. The extruding apparatus 305 occupies the remaining space.

Referring to FIGS. 34 to 38, the water-electrolysis components 304 are made of HDPE tubing 311 which are produced in great quantity for agriculture and other applications (thus low-cost). A metal rod 313, made of stainless steel or another appropriate material, operates as an electrode. Sections of the metal rod 313 may be wrapped in a conducting material 320 intended to increase contact surface (see example on FIG. 38). The top parts (317, 318) are not in contact with the water+electrolyte and do not need to be made of HDPE. O2 is collected on one side, via conduit 314. H2 is collected on the other side, via conduit 315. Liquid can be added through an extra port 316.

Figure 39:
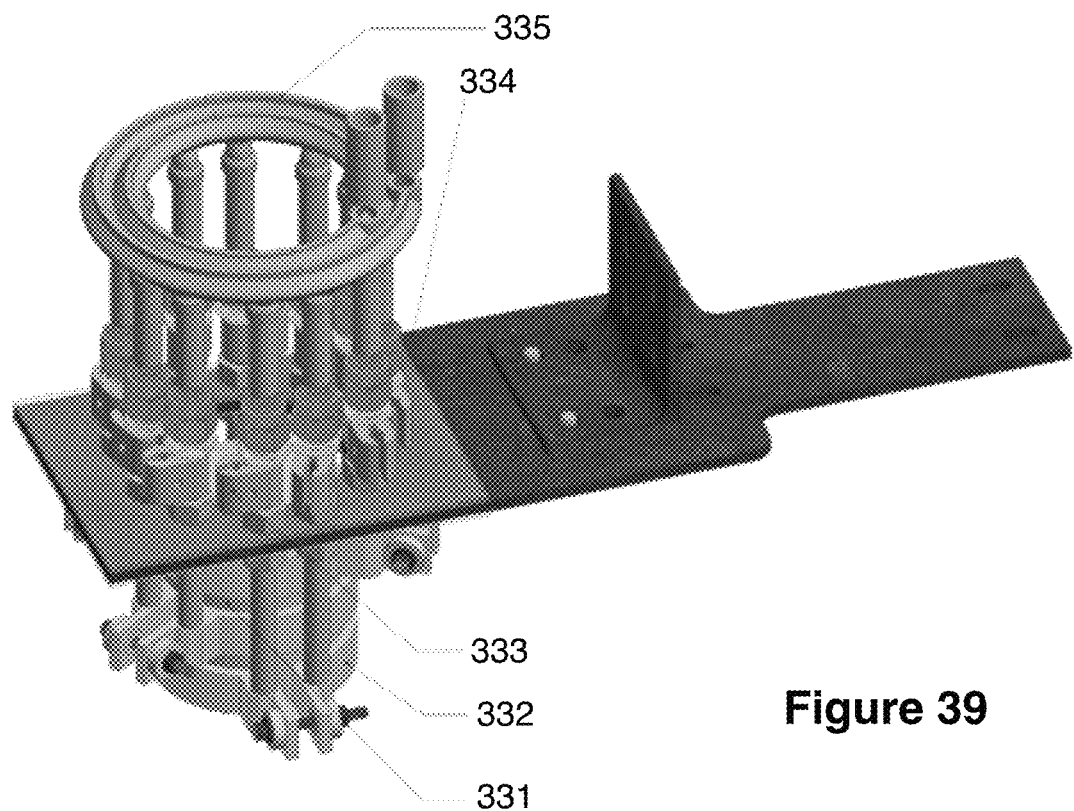
FIG. 39 is respective a perspective view of a first heating head for AMD and associated components.

Referring now to FIG. 39, the 3D printed heating head 331, made from depositing powders layer-by-layer and pressing/heating it, is held and powered by 3D printed water-cooled electrodes 332, with connectors 333 for cables, mechanically coupled to a Computer Numerical Control (CNC) (not shown) via a steel plate 334 and the numerous water inputs and outputs are combined through a collector 335, with two pipes (cold and hot) going to the hot-end.

Figure 40:
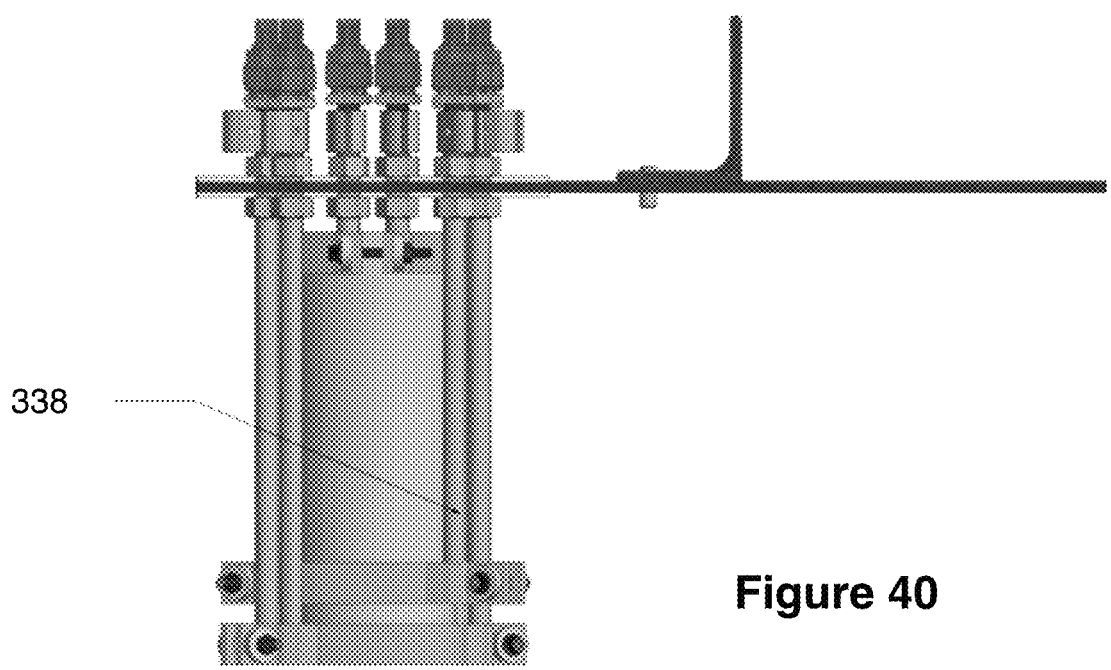
FIG. 40 is a front view of a second heating head for AMD and associated components.

Referring to FIG. 40, a variant with a longer heating head 338 is depicted.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A method for manufacturing objects made of superposed subsequent depositions of layers of material on top of each other, the method comprising steps of:
   depositing one or more layers of material inside a mold;
   pressurizing the inside of the mold;
   heating the inside of the mold thereby sintering or synthesizing the material with heat;
   depressurizing the mold; and
   repeating at least once the depositing over the previous deposited one of more layers of material, and repeating the steps of the pressurizing, the heating and the depressurizing.

2. The method of claim 1, wherein the pressurizing the inside of the mold comprises sealably closing the mold and injecting pressurized gas inside the mold.

3. The method of claim 2, wherein the layers of material comprise a top layer, and wherein the heating the inside of the mold comprises using a heat element above the top layer of material to heat the one or more layers of material and the pressured gas.

4. The method of claim 1, further comprising performing the depositing at a material deposition station and the pressurizing, heating and depressurizing at one of a heating station, a sintering station, and a synthesizing station.

5. The method of claim 1, wherein the pressurizing the inside of the mold comprises injecting gas into the mold under of pressure of at least 20 kpsi, wherein the pressure of the gas inside the mold increases further when heating the inside of the mold.

6. The method of claim 1, wherein the depositing of one or more layers of material comprises depositing a single layer of material.

7. The method of claim 1, further comprising a step of moving the mold between at least a first station and a second station distant from each other wherein at least a first one of the steps of the method is performed at the first station and a second one of the steps of the method is performed at the second station.

8. The method of claim 1, wherein the step of depositing one or more layers of material comprises feeding the material using an actively cooled material-feeding component.

9. The method of claim 1, further comprising providing the mold, comprising stacking plates to provide the mold.

10. The method of claim 9, wherein the step of stacking plates comprises stacking a new plate on top of another plate before depositing a subsequent layer of material.

11. The method of claim 9, further comprising inserting a seal between two of the plates.

12. The method of claim 9, wherein providing the mold comprises mounting a refractory sleeve inside an external structure.

13. The method of claim 9, wherein the mold as a top and a bottom, and wherein providing the mold comprises providing a cooling plate mounted about one of the top and the bottom of the mold.

14. The method of claim 9, wherein providing the mold comprises providing a diffusion plate in communication with space enclosed in the mold, wherein the diffusion plate participates in lowering pressure of the enclosed space.

15. The method of claim 1, wherein the material comprises a first material in contact with a second material, wherein the first material and the second material, upon heating, react with each other to generate a new material.

16. The method of claim 1, wherein the material comprises a first material and a second material, wherein the first material and the second are deposited at distinct locations in the mold.

17. The method of claim 1, further comprising depositing lubricant over a portion of the mold at least one of before depositing a layer of material, and before depositing another one of the at least one layer of material.

* * * * *